(12) United States Patent
Kawamura

(10) Patent No.: US 9,075,222 B2
(45) Date of Patent: Jul. 7, 2015

(54) IMAGING LENS AND IMAGING APPARATUS

(71) Applicant: FUJIFILM Corporation, Tokyo (JP)

(72) Inventor: Daiki Kawamura, Saitama-ken (JP)

(73) Assignee: FUJIFILM CORPORATION, Tokyo (JP)

(*) Notice: Subject to any disclaimer, the term of this patent is extended or adjusted under 35 U.S.C. 154(b) by 0 days.

(21) Appl. No.: 14/317,813

(22) Filed: Jun. 27, 2014

(65) Prior Publication Data

US 2014/0307338 A1    Oct. 16, 2014

Related U.S. Application Data

(63) Continuation of application No. PCT/JP2012/008257, filed on Dec. 25, 2012.

(30) Foreign Application Priority Data

Dec. 27, 2011    (JP) .................................. 2011-284629

(51) Int. Cl.
    *G02B 13/00*     (2006.01)
    *G02B 9/60*      (2006.01)
(52) U.S. Cl.
    CPC .............. *G02B 13/0015* (2013.01); *G02B 9/60* (2013.01); *G02B 13/0045* (2013.01)
(58) Field of Classification Search
    CPC ......... G02B 9/60; G02B 9/62; G02B 13/0045
    USPC .................................................. 359/766, 770
    See application file for complete search history.

(56) References Cited

U.S. PATENT DOCUMENTS

| 5,828,498 | A  |   | 10/1998 | Sekiya et al. |
| 6,417,975 | B1 | * | 7/2002  | Isono ............................ 359/783 |
| 7,903,348 | B2 |   | 3/2011  | Sensui |
| 8,395,846 | B2 | * | 3/2013  | Yanagisawa ................. 359/649 |
| 8,503,110 | B2 |   | 8/2013  | Oshita |

(Continued)

FOREIGN PATENT DOCUMENTS

| JP | 08-122634   | 5/1996  |
| JP | 2007-333966 | 12/2007 |

(Continued)

OTHER PUBLICATIONS

International Search Report, PCT/JP2012/008257, Apr. 23, 2013.

*Primary Examiner* — Jordan Schwartz
(74) *Attorney, Agent, or Firm* — Young & Thompson

(57) ABSTRACT

An imaging lens substantially consists of a first lens-group, a stop and a second lens-group in this order from an object-side. The first lens-group substantially consists of three or less lenses including at least one negative lens and a positive lens. The second lens-group substantially consists of a 21st lens-group and a 22nd lens-group in this order from the object-side. The 21st lens-group substantially consists of three or less lenses and has positive refractive-power. The 22nd lens-group substantially consists of two lenses of a negative lens and a positive lens in this order from the object-side. Predetermined conditional formulas about distance on an optical-axis from a most-object-side lens surface in an entire system to an image-plane, maximum image height, distance on the optical-axis from a most-object-side lens surface in the first lens-group to a most-image-side lens surface in the second lens-group, and focal-length of the entire system are satisfied.

14 Claims, 17 Drawing Sheets

EXAMPLE 1

(56) References Cited

U.S. PATENT DOCUMENTS

| | | | |
|---|---|---|---|
| 2008/0144193 A1 | 6/2008 | Adachi | |
| 2010/0085651 A1* | 4/2010 | Asami | 359/752 |
| 2010/0201782 A1 | 8/2010 | Yamada et al. | |
| 2010/0265380 A1 | 10/2010 | Fukuta | |
| 2012/0212842 A1 | 8/2012 | Hosoi et al. | |

FOREIGN PATENT DOCUMENTS

| | | |
|---|---|---|
| JP | 2009-237542 | 10/2009 |
| JP | 2009-258157 | 11/2009 |
| JP | 2010-186011 | 8/2010 |
| JP | 2011-059288 | 3/2011 |
| JP | 2011-154401 | 8/2011 |
| JP | 2012-173299 | 9/2012 |
| JP | 2012-220654 | 11/2012 |
| JP | 2012-234169 | 11/2012 |
| JP | 2013-007853 | 1/2013 |
| WO | WO 2009/063766 | 5/2009 |

* cited by examiner

EXAMPLE 1

EXAMPLE 2

EXAMPLE 3

EXAMPLE 4

EXAMPLE 5

EXAMPLE 6

EXAMPLE 7

EXAMPLE 8

EXAMPLE 9

EXAMPLE 10

EXAMPLE 1

EXAMPLE 2

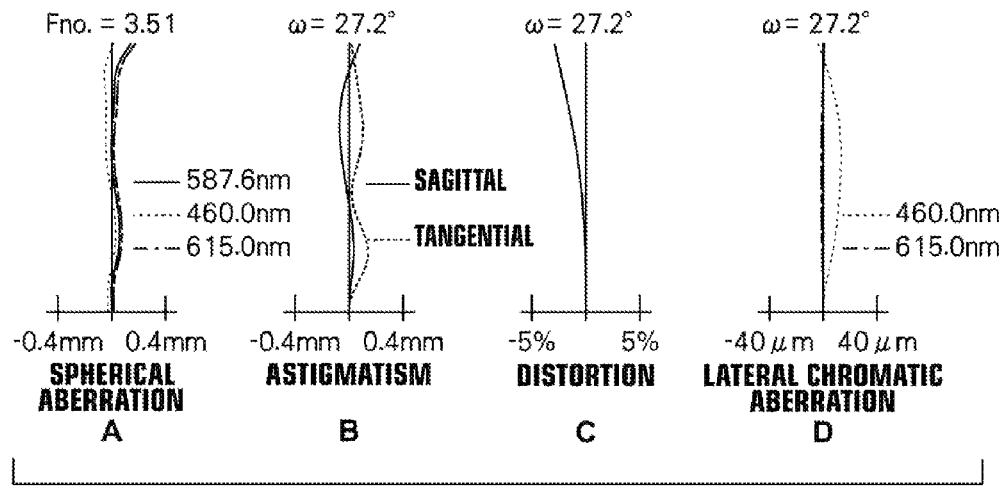
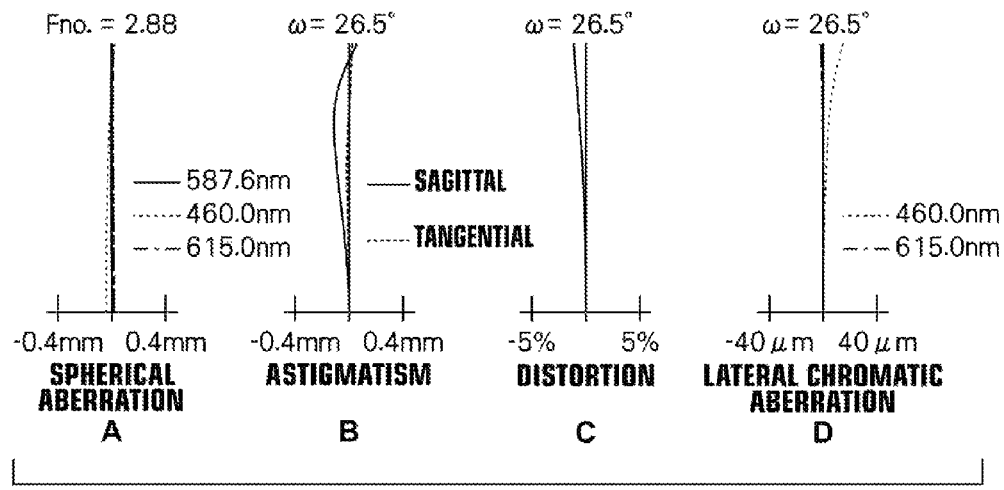

EXAMPLE 5

EXAMPLE 6

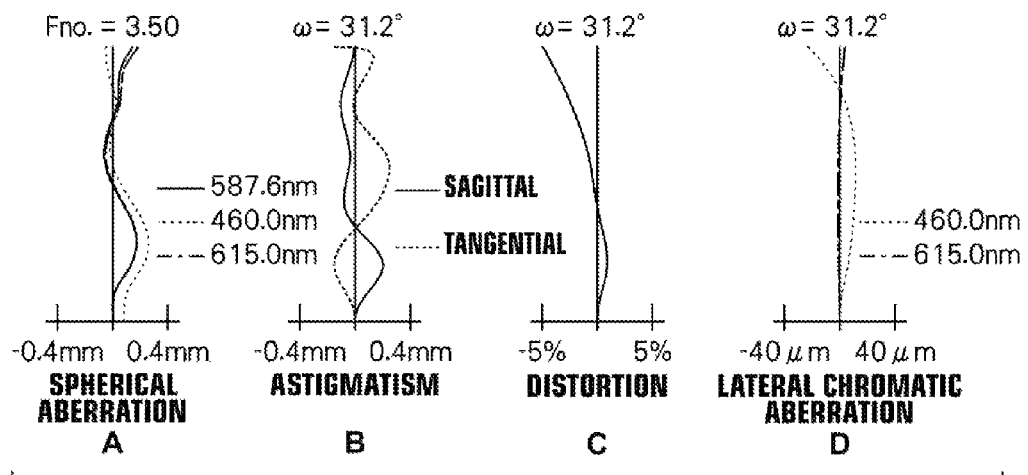
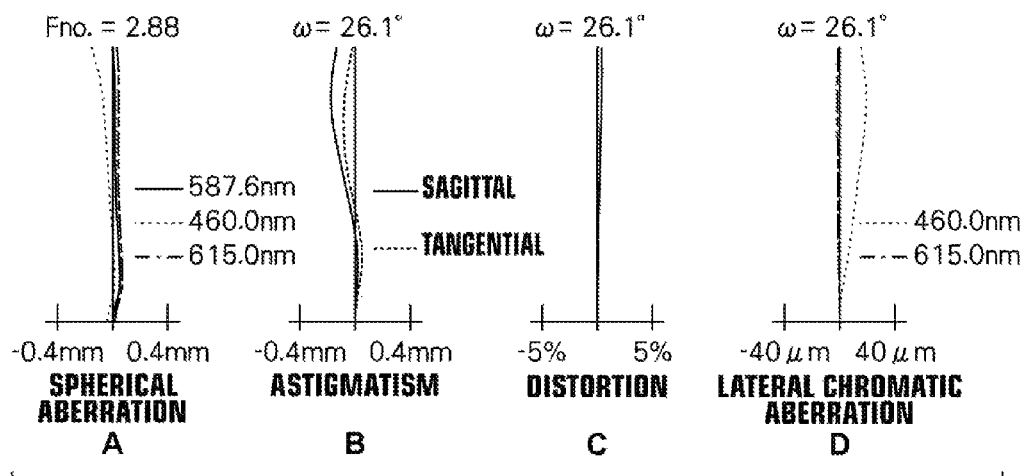

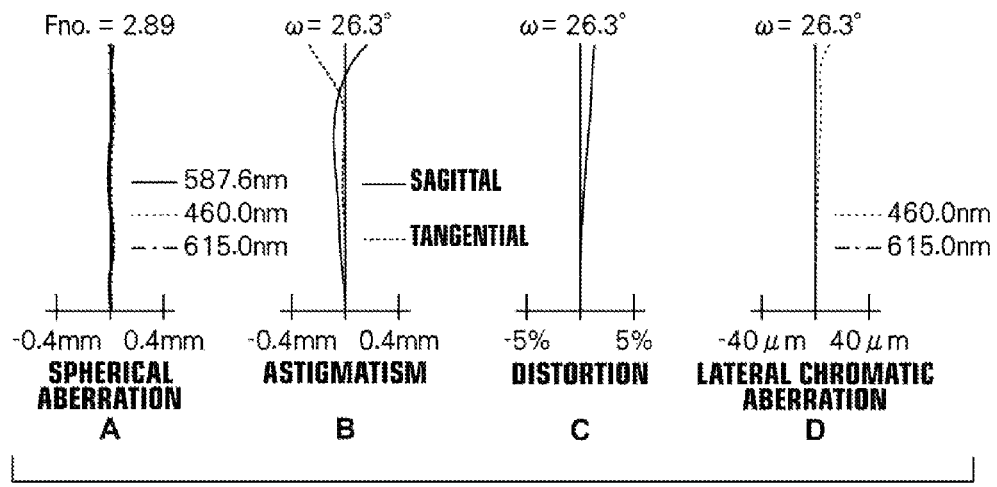
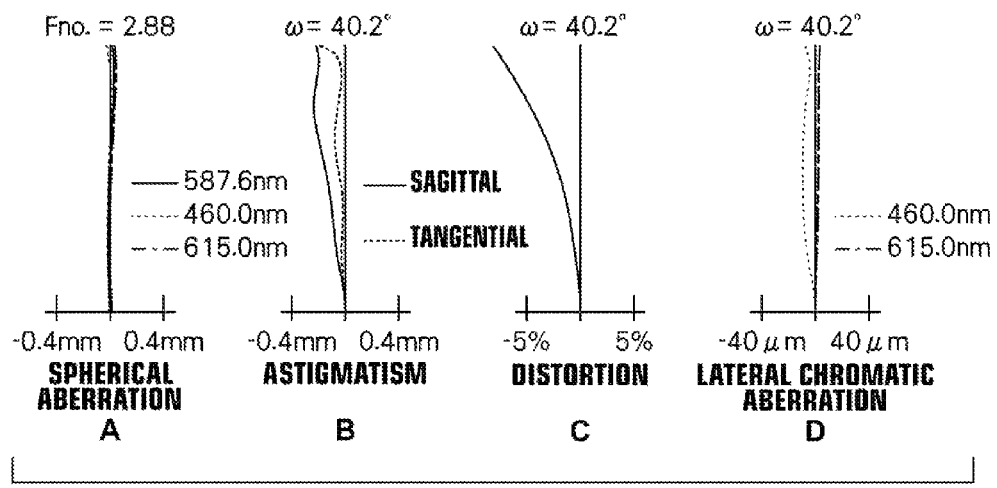

IMAGING LENS AND IMAGING APPARATUS

CROSS-REFERENCE TO RELATED APPLICATIONS

This application is a Continuation of PCT International Application No. PCT/JP2012/008257 filed on Dec. 25, 2012, which claims priority under 35 U.S.C. §119(a) to Japanese Patent Application No. 2011-284629 filed on Dec. 27, 2011. Each of the above applications is hereby expressly incorporated by reference, in its entirety, into the present application.

BACKGROUND OF THE INVENTION

1. Field of the Invention

The present invention relates to an imaging lens, and particularly to a small-size lens appropriate for an imaging apparatus, such as an electronic camera. Further, the present invention relates to an imaging apparatus including such an imaging lens.

2. Description of the Related Art

In recent years, many digital cameras with large-size imaging devices for example by APS format, Four Thirds format or the like mounted therein were provided for the market. Recently, not only digital single-lens reflex cameras but also lens-interchangeable digital cameras without reflex finders and compact cameras using the large-size imaging devices became provided. The advantage of these cameras is their excellent portability because of the small size of the entire system while achieving high image qualities. As the size of the cameras has become smaller, a need for reduction in the size and the thickness of lens systems is greatly increasing.

Small-size imaging lenses composed of a small number of lenses, and which cope with such large-size imaging devices, are proposed, for example, in Japanese Unexamined Patent Publication No. 2009-237542 (Patent Document 1), Japanese Unexamined Patent Publication No. 2009-258157 (Patent Document 2), Japanese Unexamined Patent Publication No. 2010-186011 (Patent Document 3) and Japanese Unexamined Patent Publication No. 2011-059288 (Patent Document 4). In all of the imaging lenses disclosed in Patent Documents 1 through 4, a negative lens is arranged closest to an object side, and they have a lens structure with so-called retrofocus-type or similar arrangement of refractive power.

SUMMARY OF THE INVENTION

When imaging lenses are used as interchangeable lenses for cameras, especially, for single-lens reflex cameras, a long back focus is needed in some cases to insert various optical elements between a lens system and an imaging device, or to secure an optical path length for a reflex finder. In such a case, retrofocus-type arrangement of refractive power is appropriate.

Meanwhile, even in the imaging apparatuses using the aforementioned large-size imaging devices by APS format or the like, such a long back focus as required in an interchangeable lens for a single-lens reflex camera is not needed in some cases, depending on the structure of the imaging apparatus, such as a lens-interchangeable-type camera without a reflex finder or a compact camera with a built-in lens.

Here, all of the imaging lenses disclosed in Patent Documents 1 through 4 are structured in such a manner that a negative lens is arranged closest to the object side. Further, a negative lens, a positive lens and a positive lens are arranged on the image plane side of a stop. The optical total length of such type of imaging lens inevitably becomes long to secure both of a long back focus and optical performance.

When the imaging lenses disclosed in Patent Documents 1 through 4 are applied to imaging apparatuses using the aforementioned large-size imaging devices by APS format or the like, it is possible to secure high optical performance. However, it is desirable that the size of the imaging lenses is also reduced to meet the excellent portability of the imaging apparatuses, the size of which as the entire system is small.

In view of the foregoing circumstances, it is an object of the present invention to provide a thin low-cost imaging lens formable in small size while securing optical performance for coping with a large-size imaging device, and to provide an imaging apparatus to which the imaging lens has been applied.

An imaging lens of the present invention substantially consists of a first lens group, a stop and a second lens group in this order from an object side. The first lens group substantially consists of three or less lenses including at least one negative lens and a positive lens. The second lens group substantially consists of a 21st lens group and a 22nd lens group in this order from the object side. The 21st lens group substantially consists of three or less lenses and has positive refractive power. The 22nd lens group substantially consists of two lenses of a negative lens and a positive lens in this order from the object side. Further, the following conditional formulas (1), (2) and (3) are satisfied:

$$2.1 < TL/Y < 2.9 \tag{1}$$

$$0.50 < \Sigma d/TL < 0.85 \tag{2}; \text{ and}$$

$$0.35 < Y/f < 0.85 \tag{3}, \text{ where}$$

TL: a distance on an optical axis from a most-object-side lens surface in an entire system to an image plane (a back focus portion is a distance in air), Y: a maximum image height, $\Sigma d$: a distance on the optical axis from a most-object-side lens surface in the first lens group to a most-image-side lens surface in the second lens group, and f: a focal length of the entire system.

The imaging lens of the present invention substantially consists of the first lens group and the second lens group. However, lenses substantially without any refractive power, optical elements other than lenses, such as a stop and a cover glass, mechanical parts, such as a lens flange, a lens barrel, an imaging device, and a hand shake blur correction mechanism, and the like may be included in addition to the two lens groups.

Further, in the present invention, the surface shape of a lens, such as a convex surface, a concave surface, a flat surface, biconcave, meniscus, biconvex, plano-convex and plano-concave, and the sign of the refractive power of a lens, such as positive and negative, are considered in a paraxial region unless otherwise mentioned when a lens includes an aspherical surface. Further, in the present invention, the sign of a curvature radius is positive when a surface shape is convex toward an object side, and negative when a surface shape is convex toward an image side.

Here, maximum image height Y may be determined based on the specification of lens design, the specification of an apparatus on which the lens is mounted, and the like.

In the imaging lens of the present invention, it is desirable that at least one of the following conditional formulas (1-1), (2-1) and (3-1) is satisfied:

$$2.2 < TL/Y < 2.8 \quad (1\text{-}1);$$

$$0.55 < \Sigma d/TL < 0.80 \quad (2\text{-}1); \text{ and}$$

$$0.40 < Y/f < 0.82 \quad (3\text{-}1).$$

In the imaging lens of the present invention, it is desirable that the following conditional formula (4) is satisfied. It is more desirable that the following conditional formula (4-1) is satisfied:

$$0.70 < ST/TL < 0.95 \quad (4); \text{ and}$$

$$0.75 < ST/TL < 0.92 \quad (4\text{-}1), \text{ where}$$

ST: a distance on the optical axis from the stop to the image plane, and

TL: the distance on the optical axis from the most-object-side lens surface in the entire system to the image plane (a back focus portion is a distance in air).

In the imaging lens of the present invention, it is desirable that the first lens group has positive refractive power.

In the imaging lens of the present invention, it is desirable that the following conditional formula (5) is satisfied. It is more desirable that the following conditional formula (5-1) is satisfied:

$$0.6 < f/f1 < 1.4 \quad (5); \text{ and}$$

$$0.7 < f/f1 < 1.3 \quad (5\text{-}1), \text{ where}$$

f1: a focal length of the first lens group, and f: a focal length of the entire system.

Further, in the imaging lens of the present invention, it is desirable that the first lens group substantially consists of two lenses of a negative lens having a meniscus shape with its convex surface facing the object side and a positive lens in this order from the object side.

In the imaging lens of the present invention, it is desirable that the two lenses constituting the first lens group are cemented together.

In the imaging lens of the present invention, it is desirable that the 22nd lens group has negative refractive power.

In the imaging lens of the present invention, it is desirable that the following conditional formulas (6) and (7) are satisfied:

$$Nd22p > 1.70 \quad (6); \text{ and}$$

$$28 < vd22p < 56 \quad (7), \text{ where}$$

Nd22p: a refractive index of the positive lens constituting the 22nd lens group for d-line, and vd22p: an Abbe number of the positive lens constituting the 22nd lens group for d-line.

Further, in the imaging lens of the present invention, it is desirable that the following conditional formulas (8) and (9) are satisfied:

$$Nd1p > 1.75 \quad (8); \text{ and}$$

$$35 < vd1p < 55 \quad (9), \text{ where}$$

Nd1p: a refractive index of the positive lens constituting the first lens group for d-line, and vd1p: an Abbe number of the positive lens constituting the first lens group for d-line.

In this case, it is more desirable that the following conditional formula (9-1) is satisfied:

$$38 < vd1p < 52 \quad (9\text{-}1).$$

Further, in the imaging lens of the present invention, it is desirable that the 21st lens group substantially consists of a positive lens and a negative lens.

In the imaging lens of the present invention, the 21st lens group may substantially consist of a positive lens.

An imaging apparatus according to the present invention includes the imaging lens of the present invention, as described above.

In the imaging lens of the present invention, the first lens group substantially consists of at least one negative lens and a positive lens. Therefore, it is possible to correct various aberrations, such as a spherical aberration, curvature of field and chromatic aberrations, generated in the first lens group, in a well-balanced manner.

Further, telephoto-type arrangement of refractive power is adopted by arranging, in the second lens group, positive refractive power of the 21st lens group and a negative lens on the rear side of the 21st lens group, or by arranging positive refractive power of the first lens group and the 21st lens group and a negative lens constituting the 22nd lens group, which is arranged on the rear side of the 21st lens group. Therefore, it is possible to reduce the optical total length.

Further, the negative lens constituting the 22nd lens group bends, away from the optical axis, peripheral rays that have passed through lenses arranged on the object side of the negative lens. Therefore, it is possible to increase the angle of rays with respect to the optical axis. The back focus does not become too long, and it is possible to optimize the back focus. Further, it is possible to reduce the size of the lens system arranged on the object side of the negative lens. Therefore, it is possible to reduce the size of the lens system.

Meanwhile, it is also important to maintain telecentricity to lighten problems, such as shading caused by rays entering an imaging device in an oblique direction, as well as achieving reduction in size. According to the present invention, the positive lens constituting the 22nd lens group, and which is arranged on the most image-plane side, makes the position of an exit pupil far away from the image formation plane. Therefore, the exit angle of rays is suppressed.

Further, since conditional formulas (1) through (3) are satisfied, it is possible to reduce the size. Further, it is possible to excellently correct various aberrations. Therefore, it is possible to realize an imaging lens with high optical performance that can obtain excellent images even in a peripheral portion of an image formation area.

The imaging apparatus of the present invention includes the imaging lens of the present invention. Therefore, the imaging apparatus is structurable in small size and at low cost. Further, excellent images with high resolution, and in which various aberrations have been corrected, are obtainable.

BRIEF DESCRIPTION OF THE DRAWINGS

FIG. 13, Sections A through D are aberration diagrams of the imaging lens according to Example 3 of the present invention;

FIG. 14, Sections A through D are aberration diagrams of the imaging lens according to Example 4 of the present invention;

FIG. 17, Sections A through D are aberration diagrams of the imaging lens according to Example 7 of the present invention;

FIG. 18, Sections A through D are aberration diagrams of the imaging lens according to Example 8 of the present invention;

FIG. 19, Sections A through D are aberration diagrams of the imaging lens according to Example 9 of the present invention;

FIG. 20, Sections A through D are aberration diagrams of the imaging lens according to Example 10 of the present invention;

DESCRIPTION OF THE PREFERRED EMBODIMENTS

Figure 1:
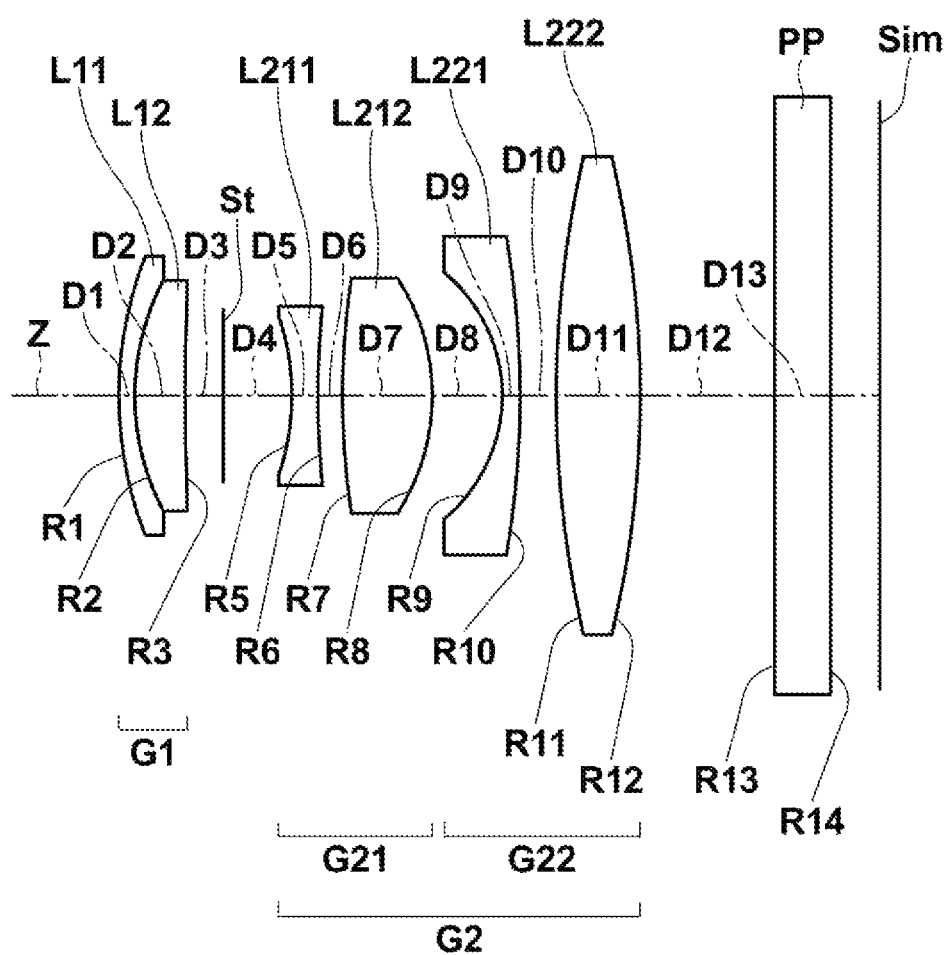
FIG. 1 is a cross section illustrating the lens structure of an imaging lens according to Example 1 of the present invention.

Hereinafter, embodiments of the present invention will be described in detail with reference to drawings. FIG. 1 is a cross section illustrating an example of the structure of an imaging lens according to an embodiment of the present invention. FIG. 1 corresponds to an imaging lens of Example 1, which will be described later. FIG. 2 through FIG. 10 are cross sections illustrating other examples of the structure of an imaging lens according to embodiments of the present invention. FIG. 2 through FIG. 10 correspond to imaging lenses of Examples 2 through 10, which will be described later, respectively. In the examples illustrated in FIG. 1 through FIG. 10, the basic structure is similar to each other except the numbers of lenses constituting two lens groups, and the illustration method is also similar. Therefore, the imaging lens according to the embodiments of the present invention will be described mainly with reference to FIG. 1.

In FIG. 1, the left side is the object side and the right side is the image side, and the arrangement of an optical system at infinity focus is illustrated. FIG. 2 through FIG. 10, which will be described later, are illustrated in a similar manner.

The imaging lens according to an embodiment of the present invention substantially consists of first lens group G1 and second lens group G2, as lens groups, in this order from the object side. Further, aperture stop St is arranged between first lens group G1 and second lens group G2.

First lens group G1 substantially consists of three or less lenses including at least one negative lens (a lens having negative refractive power) and a positive lens (a lens having positive refractive power) in this order from the object side. In the embodiment of the present invention, first lens group G1 substantially consists of 1-1st lens L11, which is a negative lens, and 1-2nd lens L12, which is a positive lens, in this order from the object side. Further, 1-1st lens L11 and 1-2nd lens L12 are cemented together, and constitute a cemented lens.

The structure of first lens group G1 is similar also in Examples 2 through 7, which will be described later. However, in Example 8, first lens group G1 substantially consists of 1-1st lens L11, which is a positive lens, and 1-2nd lens L12, which is a negative lens, in this order from the object side. Further, 1-1st lens L11 and 1-2nd lens L12 are cemented together, and constitute a cemented lens. In Example 9, first lens group G1 substantially consists of 1-1st lens L11, which is a negative lens, 1-2nd lens L12, which is a positive lens, and 1-3rd lens L13, which is a negative lens, in this order from the object side. Further, 1-1st lens L11 and 1-2nd lens L12 are cemented together, and constitute a cemented lens. In Example 10, first lens group G1 substantially consists of 1-1st lens L11, which is a negative lens, 1-2nd lens L12, which is a positive lens, in this order from the object side.

Second lens group G2 substantially consists of 21st lens group G21 and 22nd lens group G22 in this order from the object side. 21st lens group G21 substantially consists of three or less lenses and has positive refractive power. 22nd lens group G22 substantially consists of two lenses of a negative lens and a positive lens in this order from the object side. In the embodiment of the present invention, 21st lens group G21 substantially consists of 21-1st lens L211, which is a negative lens, and 21-2nd lens L212, which is a positive lens, in this order from the object side. 22nd lens group substantially consists of 22-1st lens L221, which is a negative lens, and 22-2nd lens L222, which is a positive lens, in this order from the object side. Further, 21-1st lens L211 is an aspheric lens the object-side surface and the image-side surface of which are aspherical surfaces.

The structure of second lens group G2 is similar also in Examples 8 and 9, which will be described later. However, in Examples 2, 4, 5 and 10, 21-1st lens L211 and 21-2nd lens L212, which constitute 21st lens group G21, are cemented together, and constitute a cemented lens. Further, in Examples 3 and 7, 21st lens group G21 substantially consists of 21-1st lens L211, which is a positive lens. In Example 6, 21st lens group G21 substantially consists of 21-1st lens L211, which is a positive lens, 21-2nd lens L212, which is a negative lens, and 21-3rd lens L213, which is a positive lens, in this order from the object side. Further, 21-2nd lens L212 and 21-3rd lens L213 are cemented together, and constitute a cemented lens.

In Examples 3, 7 and 9, the object-side surface and the image side surface of 21-1st lens L211 are aspherical surfaces. In Example 5, the object-side surface of 22-1st lens L221 is an aspherical surface. In Example 8, the object-side surface of 21-1st lens L211 is an aspherical surface. In Example 10, the object-side surface and the image-side surface of 22-1st lens L221 are aspherical surfaces. Examples 2, 4 and 6 use no aspheric lens.

Further, aperture stop St, illustrated in FIG. 1, does not necessarily represent the size nor the shape of aperture stop St, but the position of aperture stop St on optical axis Z. Further, the sign of Sim, illustrated here, represents an image formation plane. An imaging device, for example, such as a CCD (Charge Coupled Device) and a CMOS (Complementary Metal Oxide Semiconductor), is arranged at this position, as will be described later.

Further, FIG. 1 illustrates an example in which parallel-flat-plate-shaped optical member PP is arranged between second lens group G2 and image formation plane Sim. When an imaging lens is applied to an imaging apparatus, a cover glass, various kinds of filter, such as an infrared ray cut filter and a low-pass filter, or the like is often arranged between an optical system and image formation plane Sim based on the structure of the imaging apparatus on which the lens is mounted. The aforementioned optical member PP assumes such elements.

In the imaging lens according to the embodiment of the present invention, focusing is performed by moving the entire optical system along optical axis Z.

Next, lenses constituting each lens group will be described in detail. As an example, 1-1st lens L11 is a negative lens having a meniscus shape with its convex surface facing the object side, and 1-2nd lens L12 is a positive lens having a meniscus shape with its convex surface facing the object side. 21-1st lens L211 is a biconcave lens, 21-2nd lens L212 is a biconvex lens, 22-1st lens L221 is a negative lens having a meniscus shape with its convex surface facing an image side, and 22-2nd lens L222 is a biconvex lens.

In the imaging lens according to the embodiment of the present invention, first lens group G1 substantially consists of 1-1st lens L11, which is at least one negative lens, and 1-2nd lens L12, which is a positive lens. Therefore, it is possible to correct various aberrations, such as a spherical aberration, curvature of field and chromatic aberrations, generated in first lens group G1, in a well-balanced manner. Further, telephoto-type arrangement of refractive power is adopted by arranging, in second lens group G2, positive refractive power of the 21st lens group and a negative lens in 22nd lens group G22, which is arranged on the image side of the 21st lens group, or by arranging positive refractive power of first lens group G1 and 21st lens group G21 and a negative lens in 22nd lens group G22, which is arranged on the image side of 21st lens group G21. Therefore, it is possible to reduce the optical total length.

Further, the negative lens arranged in 22nd lens group G22 bends, away from optical axis Z, peripheral rays that have passed through lenses arranged on the object side of the negative lens. Therefore, it is possible to increase the angle of rays with respect to optical axis Z. The back focus does not become too long, and it is possible to optimize the back focus. Further, it is possible to reduce the size of the lens system arranged on the object side of the negative lens. Therefore, it is possible to reduce the size of the lens system. Meanwhile, it is also important to maintain telecentricity to lighten problems, such as shading caused by rays entering an imaging device in an oblique direction, as well as achieving reduction in size. The positive lens constituting 22nd lens group G22, and which is arranged on the most image-plane side, makes the position of an exit pupil far from the image formation plane. Therefore, it is possible to suppress the exit angle of rays.

The imaging lens according to the embodiment of the present invention has the aforementioned structure, and satisfies the following conditional formulas (1), (2) and (3):

$$2.1 < TL/Y < 2.9 \quad (1);$$

$$0.50 < \Sigma d/TL < 0.85 \quad (2); \text{ and}$$

$$0.35 < Y/f < 0.85 \quad (3), \text{ where}$$

TL: a distance on an optical axis from a most-object-side lens surface in an entire system to an image plane (a back focus portion is a distance in air), Y: a maximum image height, $\Sigma d$: a distance on the optical axis from a most-object-side lens surface in first lens group G1 to a most-image-side lens surface in second lens group G2, and f: a focal length of the entire system.

Here, maximum image height Y may be determined based on the specification of lens design, the specification of an apparatus on which the lens is mounted, and the like.

Further, in the ranges defined by these conditional formulas (1) through (3), especially at least one of the following conditional formulas (1-1), (2-1) and (3-1) is satisfied:

$$2.2 < TL/Y < 2.8 \quad (1\text{-}1);$$

$$0.55 < \Sigma d/TL < 0.80 \quad (2\text{-}1); \text{ and}$$

$$0.40 < Y/f < 0.82 \quad (3\text{-}1), \text{ where}$$

Conditions defined by conditional formulas (1) through (3), in other words, specific values of the literal parts of the expressions for each example will be collectively shown in Table 18. This is similar also for conditional formulas (4) through (9), which will be described later.

As described above, when the imaging lens according to the embodiment of the present invention satisfies all of conditional formulas (1) through (3), the following effects are achievable. Specifically, conditional formula (1) defines a relationship between optical total length TL and maximum image height Y. If the value exceeds the upper limit value, that is advantageous to correction of aberrations. However, the size of the entire lens system becomes large, and that is not desirable for the portability. On the other hand, if the value is lower than the lower limit value, correction of a spherical aberration and curvature of field in the entire lens system becomes difficult, and that is not desirable.

Conditional formula (2) defines the ratio of the length of a lens part to optical total length TL. If the value exceeds the upper limit value while the optical total length is suppressed to a specific length, it becomes impossible to secure a necessary back focus. If the value exceeds the upper limit value while a necessary back focus is secured, the ratio of the lens part becomes large. Therefore, it is possible to arrange a larger number of lenses, and that is advantageous to correction of various aberrations. However, the size of the lens system becomes large, and that is not desirable. On the other hand, if the value is lower than the lower limit value while the optical total length is suppressed to a specific length, the ratio of the lens part becomes small. Therefore, correction of a spherical aberration and curvature of field in the entire lens system becomes difficult, and that is not desirable.

Conditional formula (3) defines a relationship between maximum image height Y and focal length f of the entire system. If the value exceeds the upper limit value, a focal length becomes short. Therefore, correction of curvature of field and correction of a lateral chromatic aberration become difficult, and that is not desirable. On the other hand, if the value is lower than the lower limit value, the focal length becomes long, and it becomes difficult to reduce the thickness, and that is not desirable.

In the imaging lens according to the embodiment of the present invention, especially when all of conditional formulas (1-1) through (3-1) are also satisfied in the ranges defined by conditional formulas (1) through (3), the aforementioned effects are more remarkably achievable. Here, it is not necessary that all of conditional formulas (1-1) through (3-1) are satisfied. When even one of them is satisfied, the aforementioned effects become more excellent.

Further, the imaging lens according to the embodiment of the present invention satisfies the following conditional formula (4). Further, especially the following conditional formula (4-1) is satisfied in the range defined by conditional formula (4):

$$0.70 < ST/TL < 0.95 \quad (4); \text{ and}$$

$$0.75 < ST/TL < 0.92 \quad (4\text{-}1), \text{ where}$$

ST: a distance on the optical axis from the stop to the image plane, and

TL: the distance on the optical axis from the most-object-side lens surface in the entire system to the image plane (a back focus portion is a distance in air).

When conditional formula (4) is satisfied, the imaging lens according to the embodiment of the present invention achieves the following effects. Specifically, conditional formula (4) defines the ratio of distance ST from the position of the stop to the image formation plane to optical total length TL. If the value exceeds the upper limit value, space for lenses arranged on the object side of the stop becomes small. Therefore, the number of lenses needs to be reduced, or the curvature of a lens or lenses is forced to be reduced. Therefore, correction of various aberrations becomes difficult, and that is not desirable. On the other hand, if the value is lower than the lower limit value, the position of the stop becomes closer to the imaging device. Therefore, the angle of incidence of rays entering the imaging device becomes large, and that is not desirable.

In the imaging lens according to the embodiment of the present invention, especially when conditional formula (4-1) is also satisfied in the range defined by conditional formula (4), the aforementioned effects are more remarkably achievable.

Further, in the imaging lens according to the embodiment of the present invention, first lens group G1 has positive refractive power. Therefore, it is possible to reduce the size of the lens system.

Further, the imaging lens according to the embodiment of the present invention satisfies the following conditional formula (5). Further, especially the following conditional formula (5-1) is satisfied in the range defined by conditional formula (5):

$$0.6 < f/f1 < 1.4 \quad (5); \text{ and}$$

$$0.7 < f/f1 < 1.3 \quad (5\text{-}1), \text{ where}$$

f1: a focal length of first lens group G1, and
f: a focal length of the entire system.

When conditional formula (5) is satisfied, the imaging lens according to the embodiment of the present invention achieves the following effects. Specifically, conditional formula (5) defines a relationship between focal length f of the entire system and focal length f1 of first lens group G1. If the value exceeds the upper limit value, correction of a spherical aberration and distortion generated in first lens group G1 becomes difficult, and that is not desirable. On the other hand, if the value is lower than the lower limit value, the focal length of first lens group G1 becomes long, and the optical total length becomes long. If the positive refractive power of second lens group G2 is increased to avoid this problem, it becomes difficult to correct a spherical aberration and a coma aberration in a well-balanced manner, and that is not desirable.

In the imaging lens according to the embodiment of the present invention, especially when conditional formula (5-1) is also satisfied in the range defined by conditional formula (5), the aforementioned effects are more remarkably achievable.

In the imaging lens according to the embodiment of the present invention, when first lens group G1 substantially consists of two lenses of a negative lens having a meniscus shape with its convex surface facing the object side and a positive lens in this order from the object side, well-balanced correction of a spherical aberration, curvature of field, distortion and the like generated in first lens group G1 is possible. Further, first lens group G1 substantially consists of two lenses, which are a minimum number of lenses. That is advantageous to reduction in size and cost.

In the imaging lens according to the embodiment of the present invention, when a cemented lens is used in first lens group G1, excellent achromatization is achievable.

In the imaging lens according to the embodiment of the present invention, when 22nd lens group G22 has negative refractive power, it is possible to secure a necessary back focus. Further, when 22nd lens group G22 has weak negative refractive power, a back focus does not become too long while the exit angle of rays is suppressed. Therefore, it is possible to reduce the size of the lens system.

Further, the imaging lens according to the embodiment of the present invention satisfies the following conditional formulas (6) and (7):

$$Nd22p > 1.70 \quad (6); \text{ and}$$

$$28 < vd22p < 56 \quad (7), \text{ where}$$

Nd22p: a refractive index of the positive lens constituting 22nd lens group G22 for d-line, and
vd22p: an Abbe number of the positive lens constituting 22nd lens group G22 for d-line.

When conditional formulas (6) and (7) are satisfied, the imaging lens according to the embodiment of the present invention achieves the following effects. Specifically, conditional formula (6) defines the refractive index of the positive lens arranged in 22nd lens group G22. If the value is lower than the lower limit value, control of Petzval sum becomes difficult, and correction of curvature of field becomes difficult. Conditional formula (7) defines an Abbe number of the positive lens arranged in 22nd lens group G22. If the value is not within the range defined by the conditional formula, correction of chromatic aberrations, and especially, a lateral chromatic aberration becomes difficult, and that is not desirable.

Further, the imaging lens according to the embodiment of the present invention satisfies the following conditional formulas (8) and (9). Further, especially the following conditional formula (9-1) is satisfied in the range defined by conditional formulas (8) and (9):

$$Nd1p > 1.75 \quad (8);$$

$$35 < vd1p < 55 \quad (9); \text{ and}$$

$$38 < vd1p < 52 \quad (9\text{-}1), \text{ where}$$

Nd1p: a refractive index of the positive lens constituting first lens group G1 for d-line, and vd1p: an Abbe number of the positive lens constituting first lens group G1 for d-line.

When conditional formulas (8) and (9) are satisfied, the imaging lens according to the embodiment of the present invention achieves the following effects. Specifically, conditional formula (8) defines the refractive index of the positive lens arranged in first lens group G1. If the value is lower than the lower limit value, control of Petzval sum becomes difficult, and correction of curvature of field becomes difficult. Further, it is necessary to increase the total lens length to avoid such a problem, and that is not desirable. Conditional formula (9) defines an Abbe number of the positive lens arranged in first lens group G1. If the value is not within the range defined by the conditional formula, correction of chromatic aberrations, especially, a longitudinal chromatic aberration becomes difficult, and that is not desirable.

In the imaging lens according to the embodiment of the present invention, especially when conditional formula (9-1) is also satisfied in the range defined by conditional formula (9), the aforementioned effects are more remarkably achievable.

Further, in the imaging lens according to the embodiment of the present invention, when 21st lens group G21 substantially consists of a positive lens and a negative lens, that is advantageous to reduction in the thickness of the lens system. Further, when optical performance is securable by the specification of the lens, optimum arrangement of an aspheric lens or the like, 21st lens group G21 may substantially consist of a positive lens. Then, that is advantageous to reduction in thickness, and also to reduction in weight.

Next, examples of the imaging lens of the present invention will be described, and in particular, numerical value examples will be mainly described in detail.

EXAMPLE 1

FIG. 1 is a diagram illustrating the arrangement of lens groups in an imaging lens of Example 1. Since the lens groups and each lens in the structure of FIG. 1 were described in detail already, explanations will not be repeated in the following descriptions, unless especially necessary.

Table 1 shows basic lens data on the imaging lens of Example 1. Here, data including optical member PP are shown. In Table 1, column Si shows the surface number of the i-th surface (i=1, 2, 3, . . . ). The object-side surface of a composition element located closest to the object side is the first surface, and surface numbers are assigned to composition elements in such a manner to sequentially increase toward the image side. Column Ri shows the curvature radius of the i-th surface, and column Di shows a distance on optical axis Z between the i-th surface and the (i+1)th surface. Column Ndj shows the refractive index of the j-th composition element (j=1, 2, 3, . . . ) for d-line (wavelength is 587.6 nm). A composition element closest to the object side is the first composition element, and the number j sequentially increases toward the image side. Column vdj shows the Abbe number of the j-th composition element for d-line. Here, the basic lens data including aperture stop St are shown. In the column of curvature radius, the sign of ∞(STOP) is written for a surface corresponding to aperture stop St.

In Table 1, the unit of values of curvature radius R and surface distance D is mm. In Table 1, numerical values rounded at predetermined digits are written. The sign of a curvature radius is positive when a surface shape is convex toward the object side, and negative when a surface shape is convex toward the image side.

In the lens data of Table 1, the mark of "*" is attached to the surface number of an aspherical surface, and the numerical value of a paraxial curvature radius is shown, as the curvature radius of the aspherical surface. Further, focal length f of the entire lens system and FNo. are also shown at the bottom of Table 1.

The description method in Table 1, as described so far, is similar also in Tables 3, 4, 6, 7, 9, 10, 12, 14 and 16, which will be described later.

Table 2 shows aspherical surface data on the imaging lens of Example 1. Here, the aspherical surface data show the surface numbers of aspherical surfaces and aspherical surface coefficients about the aspherical surfaces. Here, the numerical value of "E-n" (n: integer) of the aspherical surface coefficient means "$\times 10^{-n}$". The aspherical surface coefficients are values of coefficients KA, Am (m=3, 4, 5, . . 0.10) in the following aspherical equation:

$$Zd = C \cdot h^2 / \{1 + (1 - KA \cdot C^2 \cdot h^2)^{1/2}\} + \Sigma Am \cdot h^m, \text{ where}$$

Zd: depth of an aspherical surface (the length of a perpendicular from a point on the aspherical surface at height h to a plane that contacts with the vertex of the aspherical surface and is perpendicular to the optical axis), h: height (the length from the optical axis to the lens surface), C: the reciprocal of a paraxial curvature radius, and KA, Am: aspherical surface coefficients (m=3, 4, 5, . . . 10).

The description method in Table 2, as described so far, is similar also in Tables 5, 8, 11, 13, 15 and 17, which will be described later.

In all tables that will be described hereinafter, "mm" is used as the unit of length, as described above, and degree (°) is used as the unit of angle. However, since an optical system is usable by proportionally enlarging or proportionally reducing the optical system, other appropriate units may be used.

TABLE 1

EXAMPLE 1. BASIC LENS DATA

| Si (SURFACE NUMBER) | Ri (CURVATURE RADIUS) | Di (SURFACE DISTANCE) | Ndj (REFRACTIVE INDEX) | vdj (ABBE NUMBER) |
|---|---|---|---|---|
| 1 | 19.2575 | 0.80 | 1.922860 | 18.90 |
| 2 | 12.4999 | 2.51 | 1.882997 | 40.76 |
| 3 | 132.3630 | 1.67 | | |
| 4 | ∞ (STOP) | 3.42 | | |
| *5 | −12.6926 | 1.30 | 1.568645 | 58.62 |
| *6 | 42.2729 | 1.24 | | |
| 7 | 39.5446 | 4.49 | 1.729157 | 54.68 |
| 8 | −10.8939 | 3.50 | | |
| 9 | −8.0453 | 0.90 | 1.688931 | 31.07 |
| 10 | −46.7537 | 1.80 | | |
| 11 | 53.3616 | 4.20 | 1.834807 | 42.71 |
| 12 | −51.1095 | 1.67 | | |
| 13 | ∞ | 2.80 | 1.550000 | 55.00 |
| 14 | ∞ | | | |

*ASPHERICAL SURFACE
f = 29.011
FNo. = 2.88

TABLE 2

EXAMPLE 1. ASPHERICAL SURFACE DATA

ASPHERICAL SURFACE COEFFICIENT • S5

| | |
|---|---|
| KA | 1.00000000 |
| A3 | −3.31420091E−05 |
| A4 | 6.32800780E−04 |
| A5 | −7.94791014E−04 |
| A6 | 5.16490736E−04 |
| A7 | −1.85256318E−04 |
| A8 | 3.42570943E−05 |
| A9 | −2.85113391E−06 |
| A10 | 5.71858508E−08 |

ASPHERICAL SURFACE COEFFICIENT • S6

| | |
|---|---|
| KA | 1.00000000 |
| A3 | 2.52530968E−05 |
| A4 | 3.93468129E−04 |
| A5 | −3.36277844E−04 |
| A6 | 1.41716341E−04 |
| A7 | −2.67955420E−05 |
| A8 | −5.25408104E−07 |
| A9 | 8.03629915E−07 |
| A10 | −7.33388738E−08 |

Figure 11:
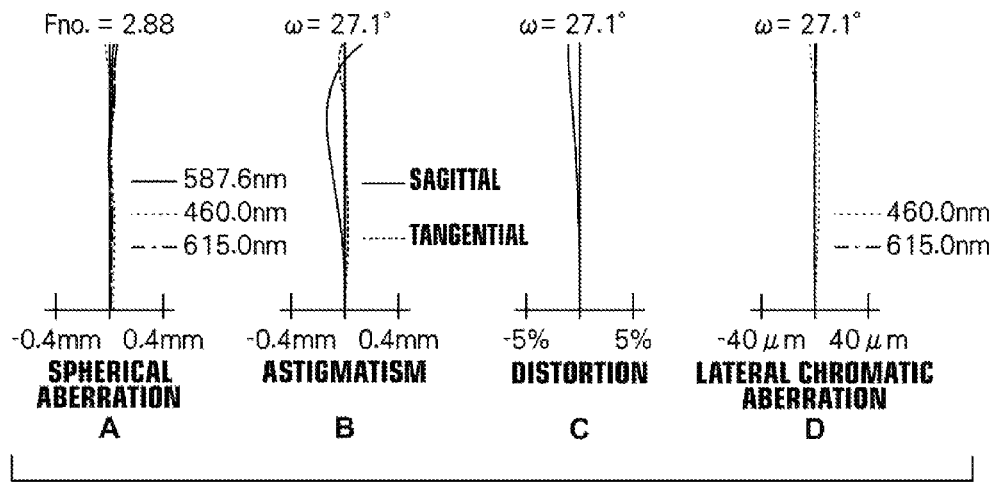
FIG. 11, Sections A through D are aberration diagrams of the imaging lens according to Example 1 of the present invention.

Here, a spherical aberration, astigmatism, distortion and a lateral chromatic aberration of the imaging lens of Example 1 at infinity focus are illustrated in FIG. 11, Sections A through D, respectively. Each aberration is based on d-line (wavelength is 587.6 nm). The diagram of the spherical aberration illustrates aberrations also for the wavelengths of 460.0 nm and 615.0 nm. Especially, the diagram of the lateral chromatic aberration illustrates aberrations for the wavelengths of 460.0 nm and 615.0 nm. In the diagram of the astigmatism, an aberration for a sagittal direction is indicated by a solid line, and an aberration for a tangential direction is indicated by a broken line. In the diagram of the spherical aberration, FNo. represents F-number, and in the other diagrams, ω represents a half angle of view. The representation method of aberrations, as described so far, is similar also in FIG. 12 through FIG. 20, which will be described later.

EXAMPLE 2

Figure 2:
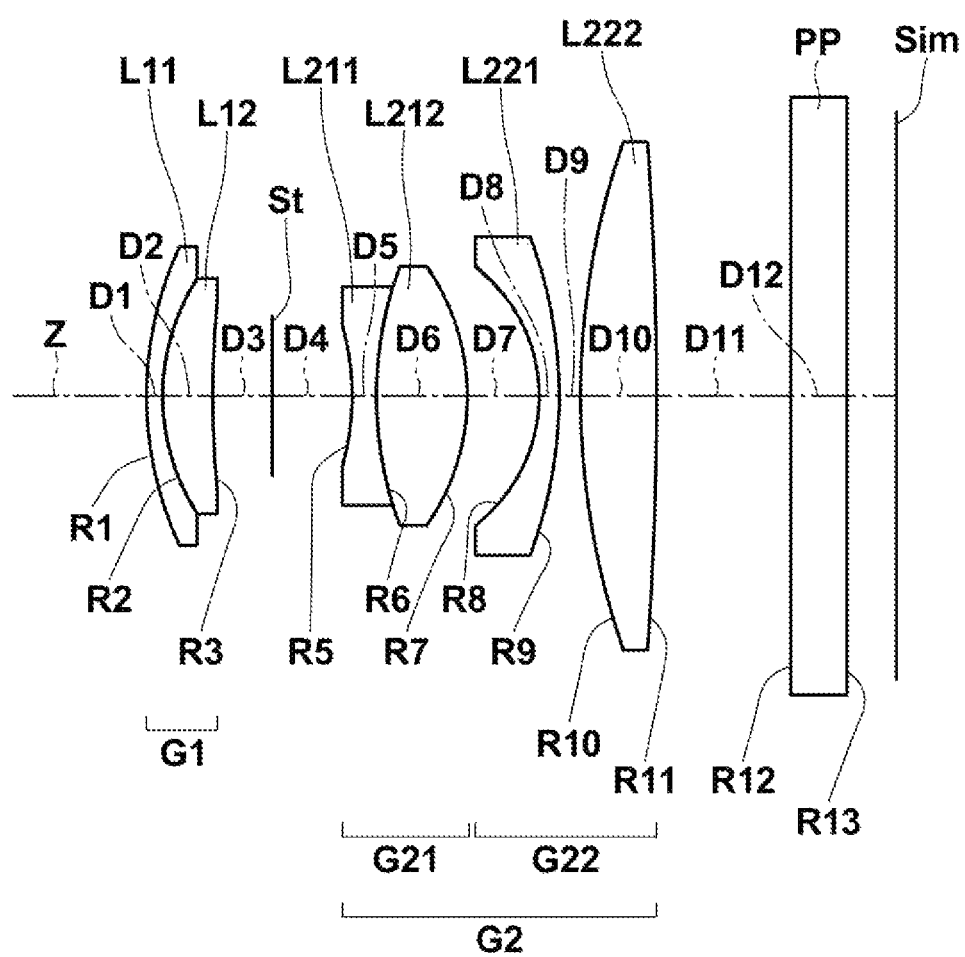
FIG. 2 is a cross section illustrating the lens structure of an imaging lens according to Example 2 of the present invention.

FIG. 2 is a diagram illustrating the arrangement of lens groups in the imaging lens of Example 2. The imaging lens of Example 2 is structured substantially in a similar manner to the imaging lens of Example 1, which has been described already. However, the imaging lens of Example 2 differs in two points that 21-1st lens L211 and 21-2nd lens L212 constituting 21st lens group G21 are cemented together, and constitute a cemented lens, and that no aspheric lens is used.

Regarding these different points from Example 1, the point that 21-1st lens L211 and 21-2nd lens L212 constituting 21st lens group G21 are cemented together, and constitute a cemented lens is similar also in Examples 4, 5 and 10, which will be described later. The point that no aspheric lens is used is similar also in Examples 4 and 6. These points will not be repeated in the explanation of these examples.

Figure 12:
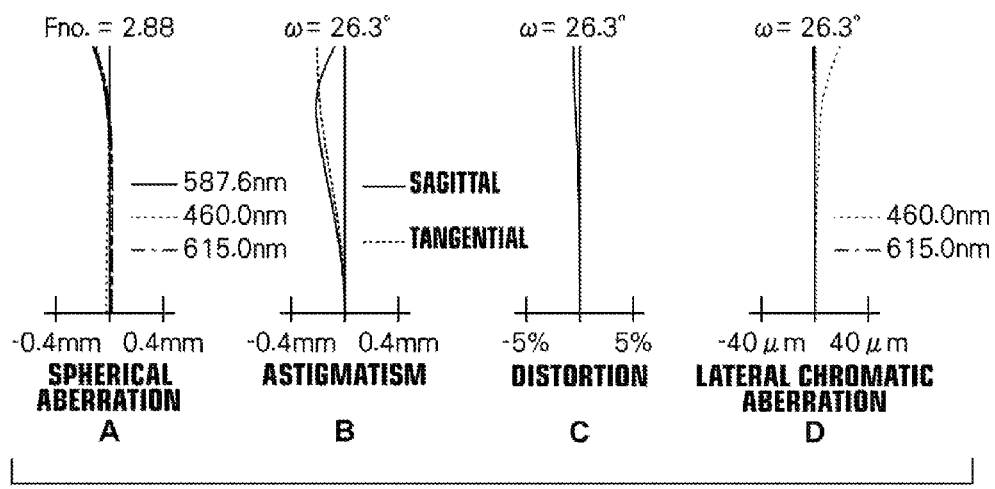
FIG. 12, Sections A through D are aberration diagrams of the imaging lens according to Example 2 of the present invention.

Table 3 shows basic lens data on the imaging lens of Example 2. FIG. 12, Sections A through D illustrate aberration diagrams of the imaging lens of Example 2.

TABLE 3

EXAMPLE 2. BASIC LENS DATA

| Si (SURFACE NUMBER) | Ri (CURVATURE RADIUS) | Di (SURFACE DISTANCE) | Ndj (REFRACTIVE INDEX) | vdj (ABBE NUMBER) |
|---|---|---|---|---|
| 1 | 17.8764 | 0.81 | 1.688931 | 31.07 |
| 2 | 10.9986 | 2.50 | 1.882997 | 40.76 |
| 3 | 52.4303 | 2.50 | | |
| 4 | ∞(STOP) | 4.00 | | |
| 5 | −12.8644 | 1.20 | 1.922860 | 20.88 |
| 6 | 18.6800 | 4.56 | 1.903658 | 31.32 |
| 7 | −11.4424 | 3.60 | | |
| 8 | −8.2051 | 1.00 | 1.622992 | 58.16 |
| 9 | −22.7057 | 1.07 | | |
| 10 | 39.1563 | 3.80 | 1.903658 | 31.32 |
| 11 | −180.3179 | 2.50 | | |
| 12 | ∞ | 2.80 | 1.550000 | 55.00 |
| 13 | ∞ | | | | f = 28.919
FNo. = 2.88

EXAMPLE 3

Figure 3:
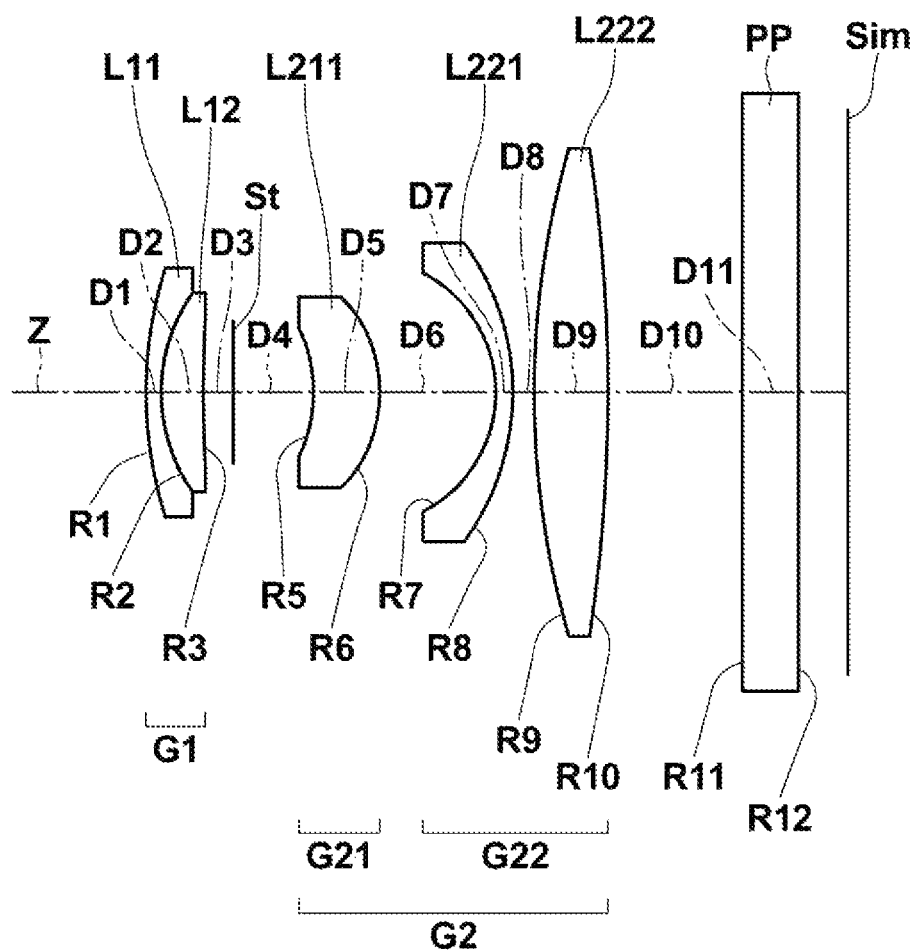
FIG. 3 is a cross section illustrating the lens structure of an imaging lens according to Example 3 of the present invention.

FIG. 3 is a diagram illustrating the arrangement of lens groups in the imaging lens of Example 3. The imaging lens of Example 3 is structured substantially in a similar manner to the imaging lens of Example 1, which has been described already. However, the imaging lens of Example 3 differs in that 21st lens group G21 substantially consist s of 21-1st lens L211, which is a positive lens having a meniscus shape with its convex surface facing the image side. This different point from Example 1 is similar also in Example 7, which will be described later. The point will not be repeated in the explanation of Example 7.

Table 4 shows basic lens data on the imaging lens of Example 3. Table 5 shows aspherical surface data on the imaging lens of Example 3. FIG. 13, Sections A through D illustrate aberration diagrams of the imaging lens of Example 3.

TABLE 4

EXAMPLE 3. BASIC LENS DATA

| Si (SURFACE NUMBER) | Ri (CURVATURE RADIUS) | Di (SURFACE DISTANCE) | Ndj (REFRACTIVE INDEX) | vdj (ABBE NUMBER) |
|---|---|---|---|---|
| 1 | 20.6773 | 0.76 | 1.761821 | 26.52 |
| 2 | 8.7504 | 2.10 | 1.882997 | 40.76 |
| 3 | 75.4363 | 2.49 | | |
| 4 | ∞(STOP) | 4.00 | | |
| *5 | −8.0150 | 3.30 | 1.677900 | 54.89 |
| *6 | −7.3995 | 5.82 | | |
| 7 | −6.7500 | 0.85 | 1.805181 | 25.42 |
| 8 | −12.7879 | 1.06 | | |
| 9 | 44.0757 | 3.70 | 1.882997 | 40.76 |
| 10 | −81.5114 | 2.49 | | |
| 11 | ∞ | 2.80 | 1.550000 | 55.00 |
| 12 | ∞ | | | |

*ASPHERICAL SURFACE
f = 28.327
FNo. = 3.51

TABLE 5

EXAMPLE 3. ASPHERICAL SURFACE DATA

ASPHERICAL SURFACE COEFFICIENT • S5

| | |
|---|---|
| KA | 1.00000000 |
| A3 | −2.92965201E−04 |
| A4 | 1.38468205E−04 |
| A5 | −5.89198633E−04 |
| A6 | 5.74438926E−04 |
| A7 | −3.37660245E−04 |
| A8 | 1.02593835E−04 |
| A9 | −1.50290921E−05 |
| A10 | 7.25609481E−07 |

ASPHERICAL SURFACE COEFFICIENT • S6

| | |
|---|---|
| KA | 1.00000000 |
| A3 | −4.51775607E−04 |
| A4 | 9.09632033E−04 |
| A5 | −9.22465329E−04 |
| A6 | 3.83474684E−04 |
| A7 | −6.66733865E−05 |
| A8 | −2.94453845E−06 |
| A9 | 2.44745612E−06 |
| A10 | −2.35201079E−07 |

EXAMPLE 4

Figure 4:
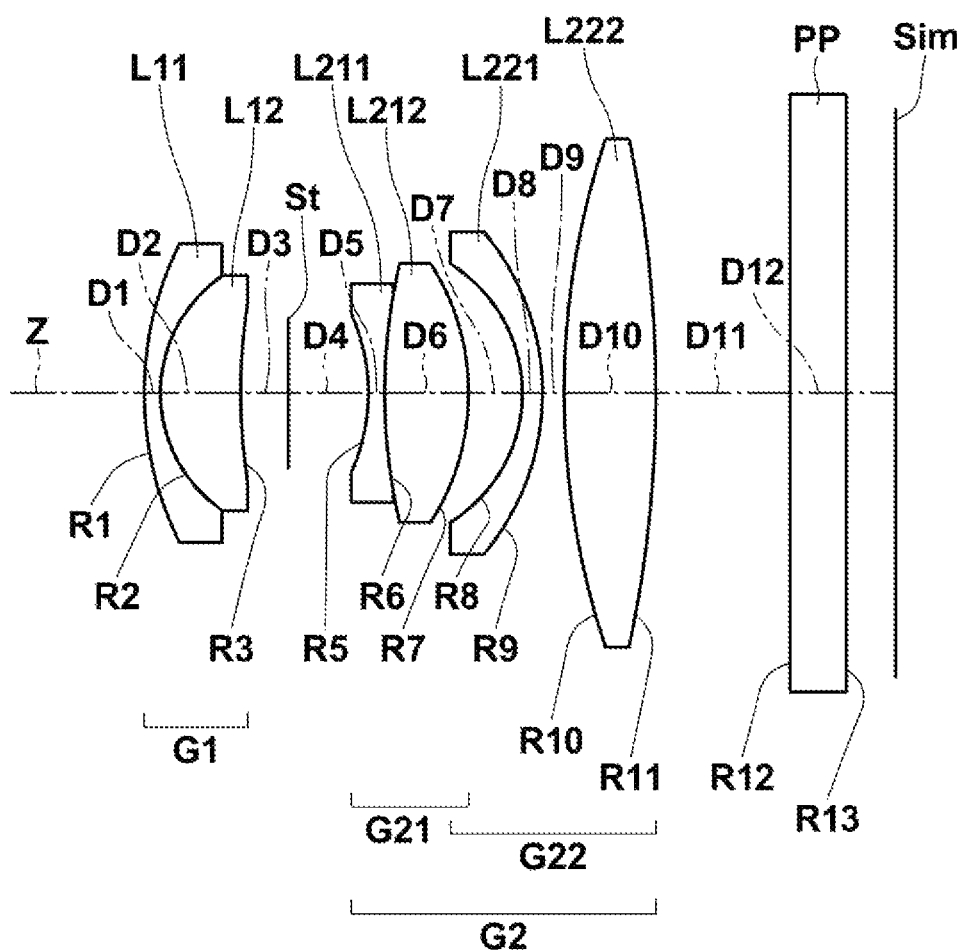
FIG. 4 is a cross section illustrating the lens structure of an imaging lens according to Example 4 of the present invention.

FIG. 4 is a diagram illustrating the arrangement of lens groups in the imaging lens of Example 4. Table 6 shows basic lens data on the imaging lens of Example 4. FIG. 14, Sections A through D show aberration diagrams of the imaging lens of Example 4.

TABLE 6

EXAMPLE 4. BASIC LENS DATA

| Si (SURFACE NUMBER) | Ri (CURVATURE RADIUS) | Di (SURFACE DISTANCE) | Ndj (REFRACTIVE INDEX) | vdj (ABBE NUMBER) |
|---|---|---|---|---|
| 1 | 16.8064 | 0.81 | 1.688931 | 31.07 |
| 2 | 7.1745 | 4.00 | 1.882997 | 40.76 |
| 3 | 28.8045 | 2.50 | | |
| 4 | ∞(STOP) | 4.00 | | |
| 5 | −9.7455 | 0.81 | 1.846660 | 23.78 |
| 6 | 28.7151 | 4.20 | 1.903658 | 31.32 |
| 7 | −12.0227 | 2.70 | | |
| 8 | −7.6415 | 1.00 | 1.622992 | 58.16 |
| 9 | −12.6468 | 1.06 | | |
| 10 | 40.1368 | 4.60 | 1.712995 | 53.87 |
| 11 | −61.2506 | 2.50 | | |
| 12 | ∞ | 2.80 | 1.550000 | 55.00 |
| 13 | ∞ | | | | f = 28.803
FNo. = 2.88

EXAMPLE 5

Figure 5:
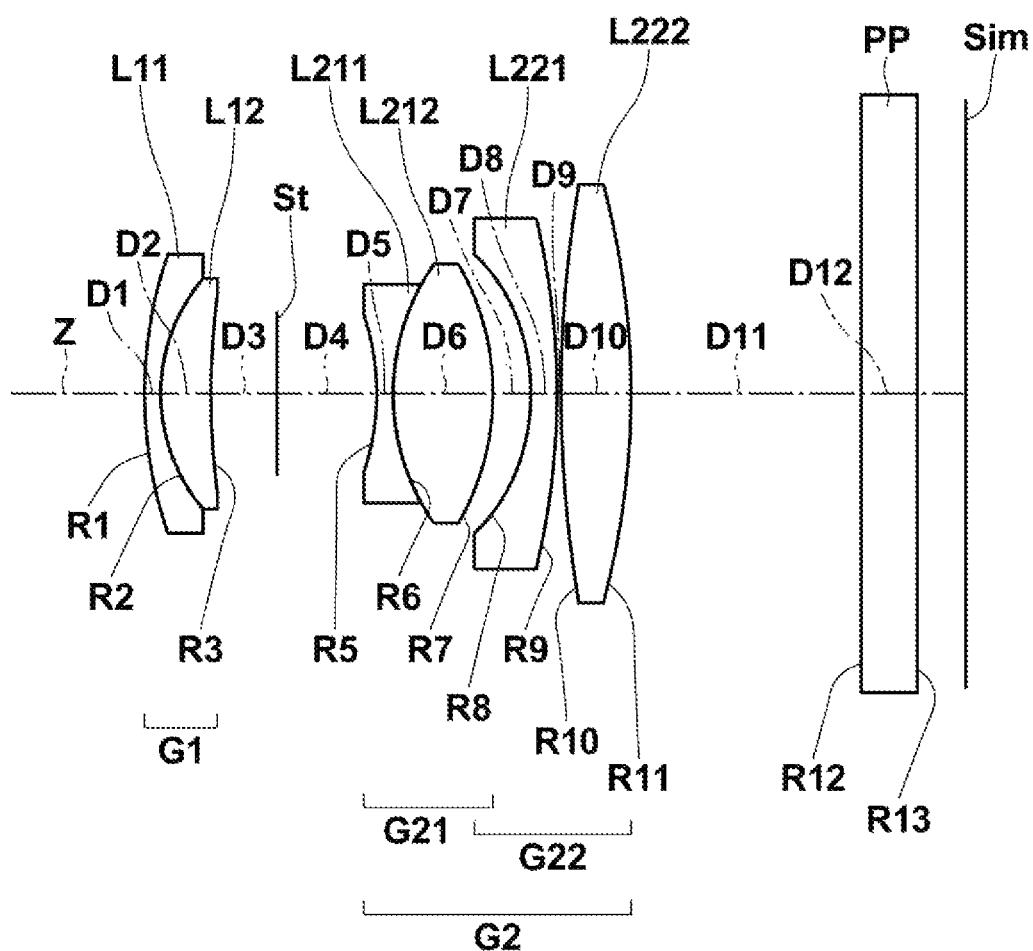
FIG. 5 is a cross section illustrating the lens structure of an imaging lens according to Example 5 of the present invention.
Figure 15:
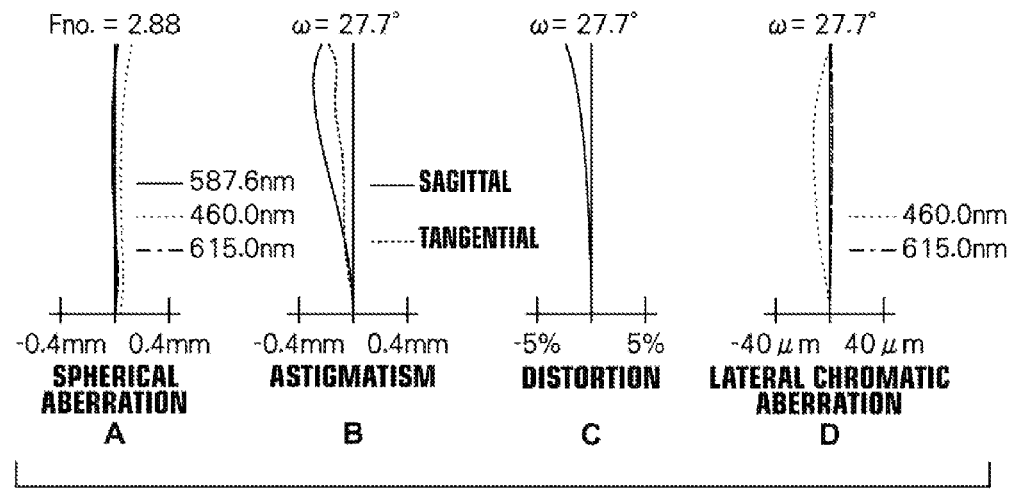
FIG. 15, Sections A through D are aberration diagrams of the imaging lens according to Example 5 of the present invention.

FIG. 5 is a diagram illustrating the arrangement of lens groups in the imaging lens of Example 5. Table 7 shows basic lens data on the imaging lens of Example 5. Table 8 shows aspherical surface data on the imaging lens of Example 5. FIG. 15, Sections A through D illustrate aberration diagrams of the imaging lens of Example 5.

TABLE 7

EXAMPLE 5. BASIC LENS DATA

| Si (SURFACE NUMBER) | Ri (CURVATURE RADIUS) | Di (SURFACE DISTANCE) | Ndj (REFRACTIVE INDEX) | vdj (ABBE NUMBER) |
|---|---|---|---|---|
| 1 | 21.7880 | 0.81 | 1.688931 | 31.07 |
| 2 | 8.9993 | 2.50 | 1.882997 | 40.76 |
| 3 | 39.1376 | 2.42 | | |
| 4 | ∞(STOP) | 5.00 | | |
| 5 | −12.4785 | 0.81 | 1.846660 | 23.78 |
| 6 | 11.4953 | 5.00 | 1.903658 | 31.32 |
| 7 | −13.0718 | 1.89 | | |
| *8 | −10.9003 | 1.30 | 1.568645 | 58.62 |
| 9 | −38.0912 | 0.20 | | |
| 10 | 62.4390 | 3.50 | 1.834807 | 42.71 |
| 11 | −40.5262 | 2.42 | | |
| 12 | ∞ | 2.80 | 1.550000 | 55.00 |
| 13 | ∞ | | | |

*ASPHERICAL SURFACE
f = 28.639
FNo. = 2.88

TABLE 8

EXAMPLE 5. ASPHERICAL SURFACE DATA
ASPHERICAL SURFACE COEFFICIENT • S8

| | |
|---|---|
| KA | 1.00000000 |
| A3 | −1.78865024E−04 |
| A4 | 2.15879830E−04 |
| A5 | −1.53930984E−04 |
| A6 | 4.43592786E−05 |
| A7 | −6.48183608E−06 |
| A8 | 2.18243207E−07 |
| A9 | 4.72111516E−08 |
| A10 | −4.29988240E−09 |

EXAMPLE 6

Figure 6:
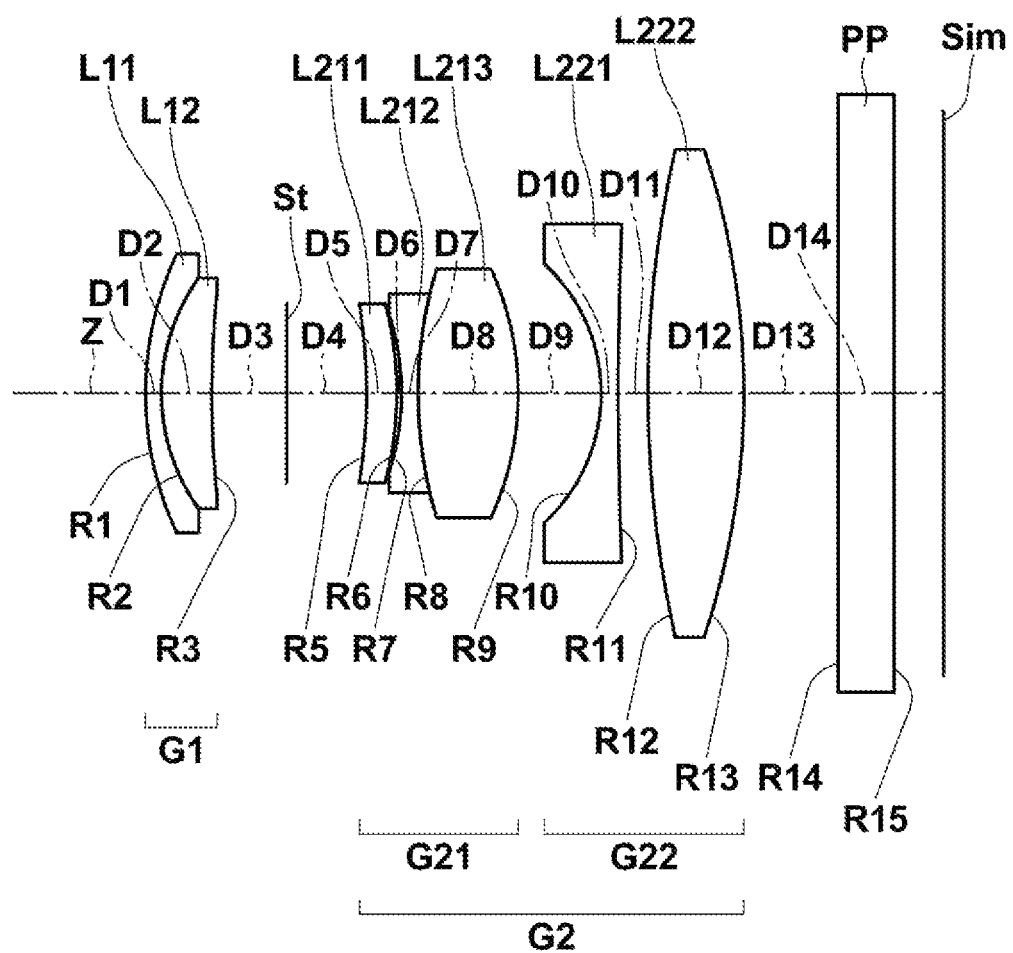
FIG. 6 is a cross section illustrating the lens structure of an imaging lens according to Example 6 of the present invention.

FIG. 6 is a diagram illustrating the arrangement of lens groups in the imaging lens of Example 6. The imaging lens of Example 6 is structured substantially in a similar manner to the imaging lens of Example 1, which has been described already. However, the imaging lens of Example 6 differs in that 21st lens group G21 substantially consists of three lenses of 21-1st lens L211, which is a positive lens having a meniscus shape with its convex surface facing the image side, 21-2nd lens L212, which is a biconcave lens, and 21-3rd lens L213, which is a biconvex lens, in this order from the object side, and that 21-2nd lens L212 and 21-3rd lens L213 are cemented together, and constitute a cemented lens.

Figure 16:
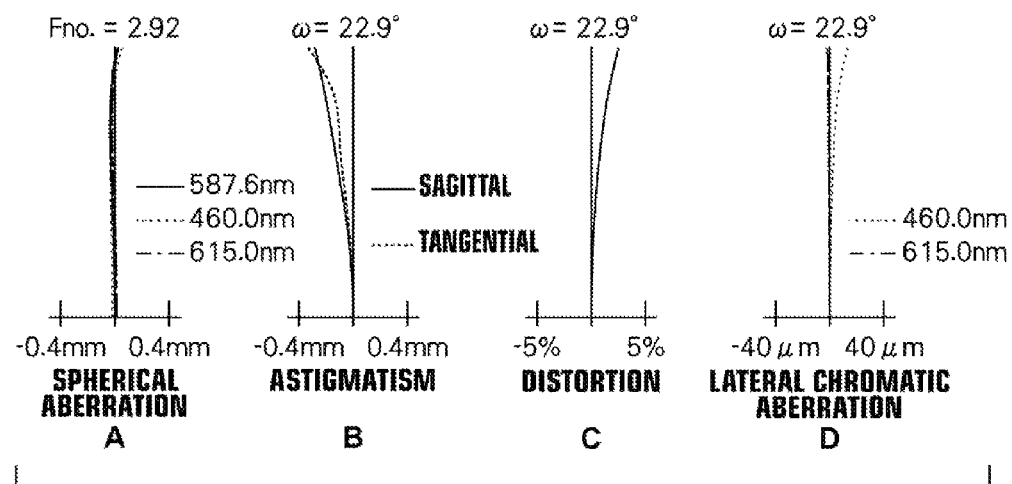
FIG. 16, Sections A through D are aberration diagrams of the imaging lens according to Example 6 of the present invention.

Table 9 shows basic lens data on the imaging lens of Example 6. FIG. 16, Sections A through D show aberration diagrams of the imaging lens of Example 6.

TABLE 9

EXAMPLE 6. BASIC LENS DATA

| Si (SURFACE NUMBER) | Ri (CURVATURE RADIUS) | Di (SURFACE DISTANCE) | Ndj (REFRACTIVE INDEX) | vdj (ABBE NUMBER) |
|---|---|---|---|---|
| 1 | 16.5072 | 0.81 | 1.672700 | 32.10 |
| 2 | 10.0000 | 2.50 | 1.772499 | 49.60 |
| 3 | 49.8907 | 2.49 | | |
| 4 | ∞(STOP) | 4.00 | | |
| 5 | −27.7336 | 1.50 | 1.903658 | 31.32 |

TABLE 9-continued

EXAMPLE 6. BASIC LENS DATA

| Si (SURFACE NUMBER) | Ri (CUR-VATURE RADIUS) | Di (SURFACE DISTANCE) | Ndj (REFRACTIVE INDEX) | νdj (ABBE NUMBER) |
|---|---|---|---|---|
| 6 | −17.7740 | 0.25 | | |
| 7 | −12.8682 | 0.81 | 1.688931 | 31.07 |
| 8 | 21.5454 | 5.00 | 1.712995 | 53.87 |
| 9 | −15.0497 | 4.16 | | |
| 10 | −8.8794 | 0.85 | 1.516330 | 64.14 |
| 11 | 203.0472 | 1.48 | | |
| 12 | 55.4382 | 4.80 | 1.882997 | 40.76 |
| 13 | −38.7212 | 2.49 | | |
| 14 | ∞ | 2.80 | 1.550000 | 55.00 |
| 15 | ∞ | | | |

$f = 32.740$
$FNo. = 2.92$

EXAMPLE 7

Figure 7:
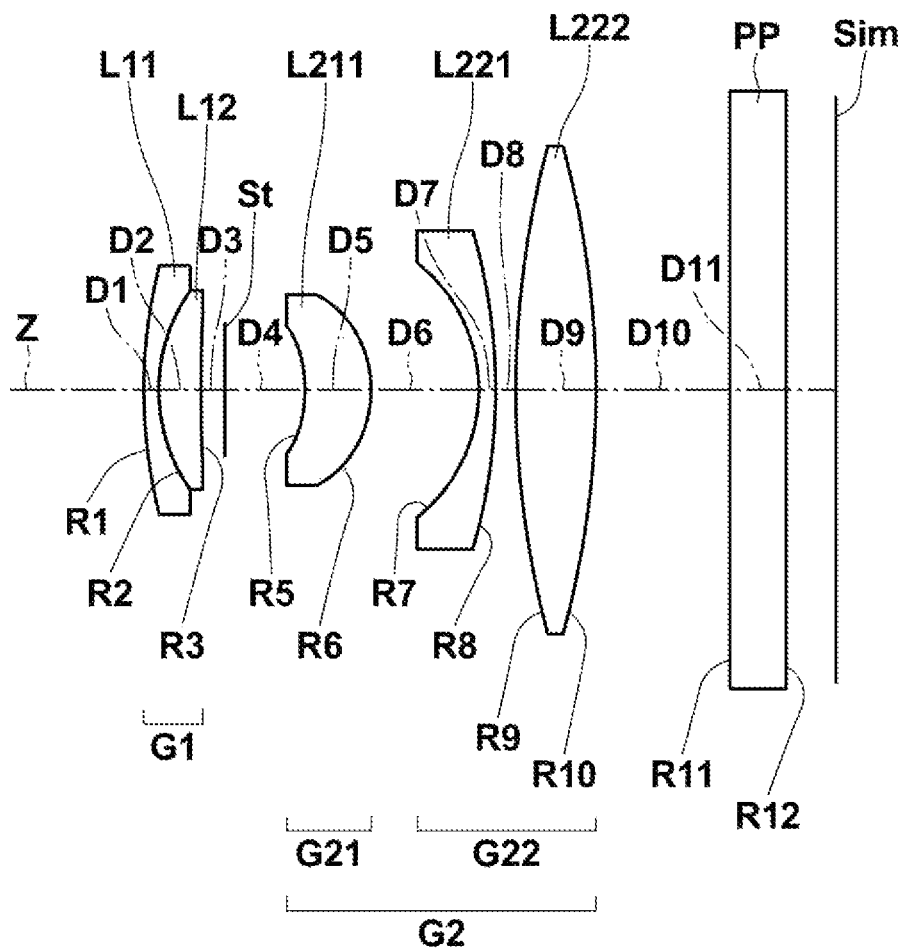
FIG. 7 is a cross section illustrating the lens structure of an imaging lens according to Example 7 of the present invention.

FIG. 7 is a diagram illustrating the arrangement of lens groups in the imaging lens of Example 7. Table 10 shows basic lens data on the imaging lens of Example 7. Table 11 shows aspherical surface data on the imaging lens of Example 7. FIG. 17, Sections A through D illustrate aberration diagrams of the imaging lens of Example 7.

TABLE 10

EXAMPLE 7. BASIC LENS DATA

| Si (SURFACE NUMBER) | Ri (CUR-VATURE RADIUS) | Di (SURFACE DISTANCE) | Ndj (REFRACTIVE INDEX) | νdj (ABBE NUMBER) |
|---|---|---|---|---|
| 1 | 25.3462 | 0.76 | 1.761821 | 26.52 |
| 2 | 8.7504 | 2.10 | 1.882997 | 40.76 |
| 3 | 87.4617 | 2.47 | | |
| 4 | ∞(STOP) | 4.00 | | |
| *5 | −6.9610 | 3.30 | 1.677900 | 54.89 |
| *6 | −5.7754 | 5.40 | | |
| 7 | −8.1729 | 0.85 | 1.805181 | 25.42 |
| 8 | −28.4698 | 1.00 | | |
| 9 | 47.8788 | 4.00 | 1.882997 | 40.76 |
| 10 | −46.2419 | 2.47 | | |
| 11 | ∞ | 2.80 | 1.550000 | 55.00 |
| 12 | ∞ | | | |

*ASPHERICAL SURFACE
$f = 25.471$
$FNo. = 3.50$

TABLE 11

EXAMPLE 7. ASPHERICAL SURFACE DATA

ASPHERICAL SURFACE COEFFICIENT • S5

| KA | 1.00000000 |
| A3 | 9.25875659E−03 |
| A4 | −1.14467380E−02 |
| A5 | 5.17948801E−03 |
| A6 | −5.54598496E−04 |
| A7 | −4.42790802E−04 |
| A8 | 1.36659292E−04 |
| A9 | −2.87112441E−06 |
| A10 | −2.29001336E−06 |

ASPHERICAL SURFACE COEFFICIENT• S6

| KA | 1.00000000 |
| A3 | 6.48127911E−03 |

TABLE 11-continued

EXAMPLE 7. ASPHERICAL SURFACE DATA

| A4 | −5.46805538E−03 |
| A5 | 1.69554769E−03 |
| A6 | −8.34085892E−06 |
| A7 | −8.73763869E−05 |
| A8 | 1.77731235E−06 |
| A9 | 4.48264056E−06 |
| A10 | −5.60010282E−07 |

EXAMPLE 8

Figure 8:
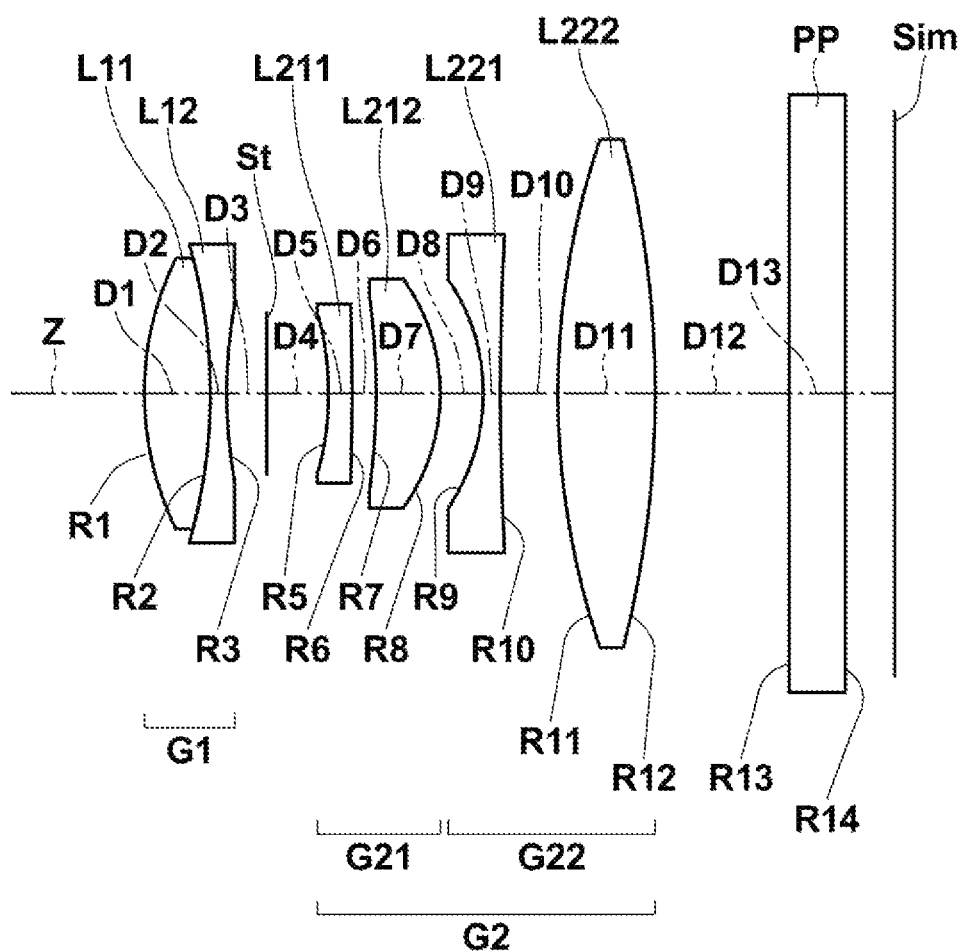
FIG. 8 is a cross section illustrating the lens structure of an imaging lens according to Example 8 of the present invention.

FIG. 8 is a diagram illustrating the arrangement of lens groups in the imaging lens of Example 8. The imaging lens of Example 8 is structured substantially in a similar manner to the imaging lens of Example 1, which has been described already. However, the imaging lens of Example 8 differs in that first lens group G1 substantially consists of 1-1st lens L11, which is a biconvex lens, and 1-2nd lens L12, which is a biconcave lens, in this order from the object side, and that 1-1st lens L11 and 1-2nd lens L12 are cemented together, and constitute a cemented lens.

Table 12 shows basic lens data on the imaging lens of Example 8. Table 13 shows aspherical surface data on the imaging lens of Example 8. FIG. 18, Sections A through D illustrate aberration diagrams of the imaging lens of Example 8.

TABLE 12

EXAMPLE 8. BASIC LENS DATA

| Si (SURFACE NUMBER) | Ri (CUR-VATURE RADIUS) | Di (SURFACE DISTANCE) | Ndj (REFRACTIVE INDEX) | νdj (ABBE NUMBER) |
|---|---|---|---|---|
| 1 | 15.3821 | 3.30 | 1.882997 | 40.76 |
| 2 | −27.1565 | 0.81 | 1.755199 | 27.51 |
| 3 | 25.0807 | 2.50 | | |
| 4 | ∞(STOP) | 3.08 | | |
| *5 | −18.0434 | 1.20 | 1.519992 | 64.23 |
| 6 | −134.7771 | 1.19 | | |
| 7 | −36.4424 | 3.20 | 1.882997 | 40.76 |
| 8 | −9.8999 | 2.16 | | |
| 9 | −10.2506 | 0.85 | 1.761821 | 26.52 |
| 10 | 145.0410 | 2.87 | | |
| 11 | 39.7785 | 4.86 | 1.834807 | 42.71 |
| 12 | −51.6599 | 2.50 | | |
| 13 | ∞ | 2.80 | 1.550000 | 55.00 |
| 14 | ∞ | | | |

*ASPHERICAL SURFACE
$f = 28.793$
$FNo. = 2.88$

TABLE 13

EXAMPLE 8. ASPHERICAL SURFACE DATA
ASPHERICAL SURFACE COEFFICIENT • S5

| KA | 1.00000000 |
| A3 | −3.05557335E−04 |
| A4 | −2.89028875E−05 |
| A5 | −1.01206948E−04 |
| A6 | 2.19702791E−05 |
| A7 | −1.37990575E−05 |
| A8 | 6.44523980E−06 |
| A9 | −1.39791401E−06 |
| A10 | 1.09741262E−07 |

EXAMPLE 9

Figure 9:
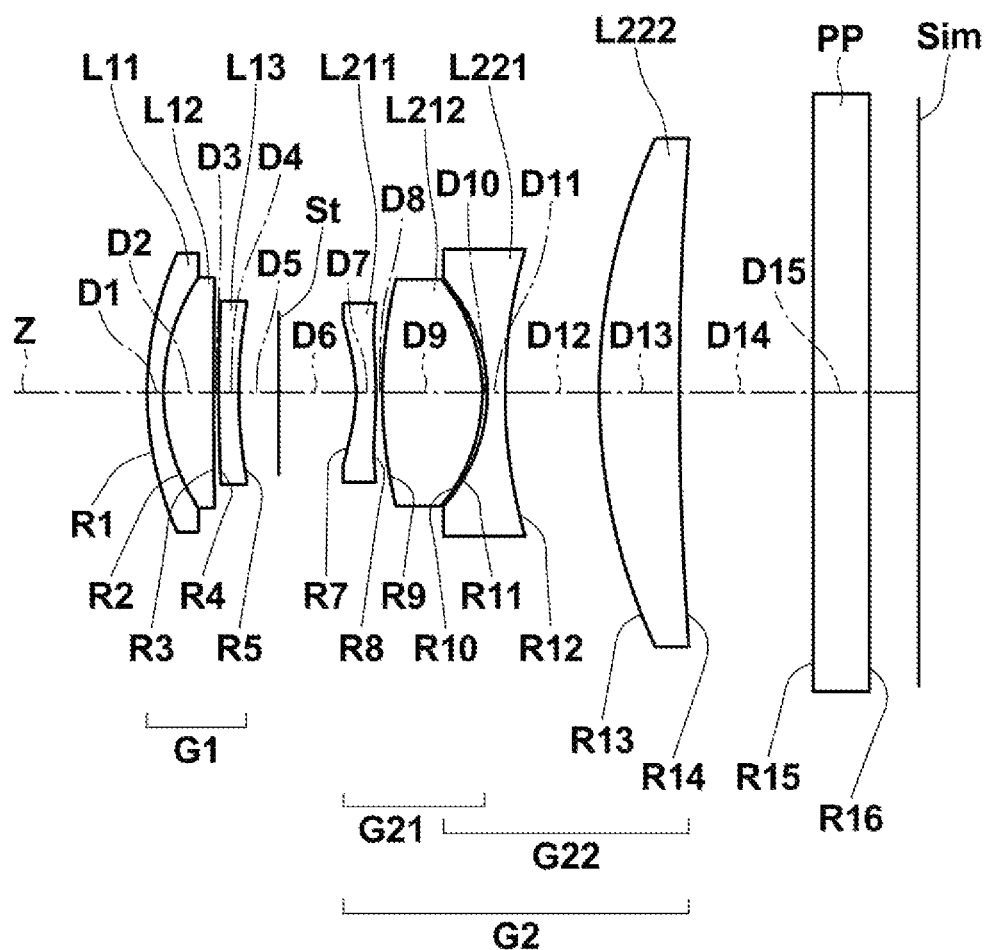
FIG. 9 is a cross section illustrating the lens structure of an imaging lens according to Example 9 of the present invention.

FIG. 9 is a diagram illustrating the arrangement of lens groups in the imaging lens of Example 9. The imaging lens of Example 9 is structured substantially in a similar manner to the imaging lens of Example 1, which has been described already. However, the imaging lens of Example 9 differs in that first lens group G1 substantially consists of 1-1st lens L11, which is a negative lens having a meniscus shape with its convex surface facing the object side, 1-2nd lens L12, which is a positive lens having a meniscus shape with its convex surface facing the object side, and 1-3rd lens L13, which is a negative lens having a meniscus shape with its convex surface facing the object side, in this order from the object side, and that 1-1st lens L11 and 1-2nd lens L12 are cemented together, and constitute a cemented lens.

Table 14 shows basic lens data on the imaging lens of Example 9. Table 15 shows aspherical surface data on the imaging lens of Example 9. FIG. 19, A through D illustrate aberration diagrams of the imaging lens of Example 9.

TABLE 14

EXAMPLE 9. BASIC LENS DATA

| Si (SURFACE NUMBER) | Ri (CURVATURE RADIUS) | Di (SURFACE DISTANCE) | Ndj (REFRACTIVE INDEX) | vdj (ABBE NUMBER) |
|---|---|---|---|---|
| 1 | 17.1104 | 0.81 | 1.688931 | 31.07 |
| 2 | 10.4998 | 2.50 | 1.882997 | 40.76 |
| 3 | 316.3598 | 0.25 | | |
| 4 | 100.6698 | 1.00 | 1.897063 | 22.78 |
| 5 | 24.8923 | 2.00 | | |
| 6 | ∞(STOP) | 3.86 | | |
| *7 | −7.3107 | 1.00 | 1.568645 | 58.62 |
| *8 | −17.6134 | 0.31 | | |
| 9 | 23.8054 | 5.00 | 1.834807 | 42.71 |
| 10 | −8.9116 | 0.25 | | |
| 11 | −8.5132 | 0.90 | 1.672700 | 32.10 |
| 12 | 26.3603 | 4.70 | | |
| 13 | 30.4201 | 4.00 | 1.882997 | 40.76 |
| 14 | 169.6677 | 2.48 | | |
| 15 | ∞ | 2.80 | 1.550000 | 55.00 |
| 16 | ∞ | | | |

*ASPHERICAL SURFACE
f = 29.302
FNo. = 2.89

TABLE 15

EXAMPLE 9. ASPHERICAL SURFACE DATA

ASPHERICAL SURFACE COEFFICIENT • S7

| KA | 1.00000000 |
|---|---|
| A3 | −8.70036789E−04 |
| A4 | 3.28231387E−03 |
| A5 | −3.27418321E−04 |
| A6 | 3.00555114E−04 |
| A7 | −2.33901433E−04 |
| A8 | 7.05966748E−05 |
| A9 | −9.79502977E−06 |
| A10 | 5.23258248E−07 |

ASPHERICAL SURFACE COEFFICIENT • S8

| KA | 1.00000000 |
|---|---|
| A3 | −1.08100854E−03 |
| A4 | 3.53783614E−03 |
| A5 | −8.32352726E−04 |
| A6 | 3.33987674E−04 |
| A7 | −8.59622839E−05 |
| A8 | −1.16991267E−06 |

TABLE 15-continued

EXAMPLE 9. ASPHERICAL SURFACE DATA

| A9 | 3.51001918E−06 |
|---|---|
| A10 | −3.70112053E−07 |

EXAMPLE 10

Figure 10:
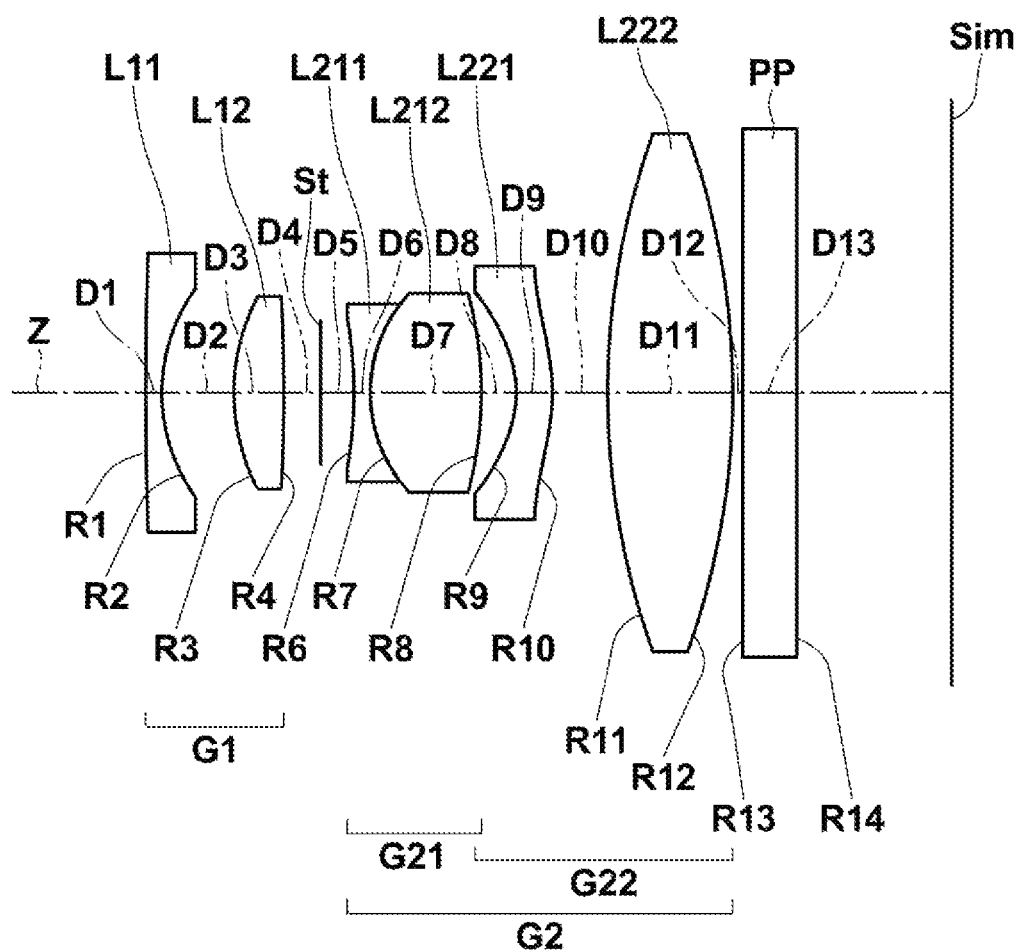
FIG. 10 is a cross section illustrating the lens structure of an imaging lens according to Example 10 of the present invention.

FIG. 10 is a diagram illustrating the arrangement of lens groups in the imaging lens of Example 10. The imaging lens of Example 10 is structured substantially in a similar manner to the imaging lens of Example 1, which has been described already. However, the imaging lens of Example 10 differs in that first lens group G1 substantially consists of 1-1st lens L11, which is a negative lens having a meniscus shape with its convex surface facing the object side, and 1-2nd lens L12, which is a biconvex lens, in this order from the object side.

Table 16 shows basic lens data on the imaging lens of Example 10. Table 17 shows aspherical surface data on the imaging lens of Example 10. FIG. 20, A through D illustrate aberration diagrams of the imaging lens of Example 10.

TABLE 16

EXAMPLE 10. BASIC LENS DATA

| Si (SURFACE NUMBER) | Ri (CURVATURE RADIUS) | Di (SURFACE DISTANCE) | Ndj (REFRACTIVE INDEX) | vdj (ABBE NUMBER) |
|---|---|---|---|---|
| 1 | 214.2268 | 0.80 | 1.531717 | 48.84 |
| 2 | 9.0476 | 3.60 | | |
| 3 | 10.5007 | 2.50 | 1.788001 | 47.37 |
| 4 | −92.4132 | 7.75 | | |
| 5 | ∞(STOP) | 1.68 | | |
| 6 | −21.7787 | 0.81 | 1.647689 | 33.79 |
| 7 | 7.4132 | 5.56 | 1.834807 | 42.71 |
| 8 | −19.1502 | 0.75 | | |
| *9 | −5.6000 | 1.80 | 1.805181 | 25.42 |
| *10 | −10.4746 | 2.77 | | |
| 11 | 38.5538 | 6.25 | 1.729157 | 54.68 |
| 12 | −38.5353 | 0.50 | | |
| 13 | ∞ | 2.70 | 1.516798 | 64.20 |
| 14 | ∞ | | | |

*ASPHERICAL SURFACE
f = 18.876
FNo. = 2.88

TABLE 17

EXAMPLE 10. ASPHERICAL SURFACE DATA

ASPHERICAL SURFACE COEFFICIENT • S9

| KA | −1.65660773 |
|---|---|
| A3 | −5.63721867E−04 |
| A4 | −2.78587862E−04 |
| A5 | 3.68504938E−05 |
| A6 | −3.41725063E−06 |
| A7 | −6.64457895E−07 |
| A8 | 1.62982660E−07 |
| A9 | −1.92287028E−08 |
| A10 | 1.05404814E−10 |
| A11 | −3.67465143E−09 |
| A12 | 5.17999008E−10 |

ASPHERICAL SURFACE COEFFICIENT • S10

| KA | −5.73497412 |
|---|---|
| A3 | −5.86782869E−04 |
| A4 | 3.96359954E−04 |
| A5 | 1.43657257E−05 |

TABLE 17-continued

EXAMPLE 10. ASPHERICAL SURFACE DATA

| | |
|---|---|
| A6 | 8.72338466E−07 |
| A7 | −2.20793371E−07 |
| A8 | −5.36918580E−08 |
| A9 | −3.00851116E−09 |
| A10 | −8.88452995E−11 |
| A11 | 2.11557293E−10 |
| A12 | −9.55884404E−12 |

Further, Table 18 shows conditions defined by the aforementioned conditional formulas (1) through (9), in other words, values of the literal parts of the expressions for each of Examples 1 through 10. Table 18 shows values for d-line. As Table 18 shows, all of the imaging lenses of Examples 1 through 10 satisfy all of conditional formulas (1) through (9). Further, they satisfy all of conditional formulas (1-1) through (5-1) and (9-1), which define more desirable ranges than the ranges defined by conditional formulas (1) through (9). Therefore, effects as described already in detail are achievable.

TABLE 18

VALUES ABOUT CONDITIONAL FORMULAS

| | EXAMPLE 1 | EXAMPLE 2 | EXAMPLE 3 | EXAMPLE 4 | EXAMPLE 5 | EXAMPLE 6 | EXAMPLE 7 | EXAMPLE 8 | EXAMPLE 9 | EXAMPLE 10 |
|---|---|---|---|---|---|---|---|---|---|---|
| (1)TL/Y | 2.52 | 2.57 | 2.43 | 2.58 | 2.72 | 2.75 | 2.29 | 2.58 | 2.55 | 2.69 |
| (2)Σd/TL | 0.70 | 0.70 | 0.67 | 0.70 | 0.61 | 0.77 | 0.67 | 0.70 | 0.71 | 0.75 |
| (3)Y/f | 0.51 | 0.49 | 0.50 | 0.49 | 0.51 | 0.43 | 0.57 | 0.49 | 0.50 | 0.78 |
| (4)ST/TL | 0.86 | 0.83 | 0.88 | 0.80 | 0.84 | 0.81 | 0.88 | 0.83 | 0.83 | 0.78 |
| (5)f/f1 | 1.12 | 1.18 | 1.12 | 1.21 | 0.93 | 1.19 | 0.88 | 1.02 | 0.97 | 0.83 |
| (6)Nd22p | 1.83 | 1.90 | 1.88 | 1.17 | 1.83 | 1.88 | 1.88 | 1.83 | 1.88 | 1.73 |
| (7)υd22p | 42.7 | 31.3 | 40.8 | 53.9 | 42.7 | 40.8 | 40.8 | 42.7 | 40.8 | 54.7 |
| (8)Nd1p | 1.88 | 1.88 | 1.88 | 1.88 | 1.88 | 1.78 | 1.88 | 1.88 | 1.88 | 1.79 |
| (9)υd1p | 40.8 | 40.8 | 40.8 | 40.8 | 40.8 | 49.6 | 40.8 | 40.8 | 40.8 | 47.4 |

FIG. 1 illustrates a case in which optical member PP is arranged between a lens system and image formation plane Sim. Instead of arranging there various filters, such as a low-pass filter and a filter that cuts a specific wavelength band, or the like, these various filters may be arranged between lenses. Alternatively, a coating having an action similar to that of various filters may be applied to a lens surface of one of the lenses.

Figure 21:
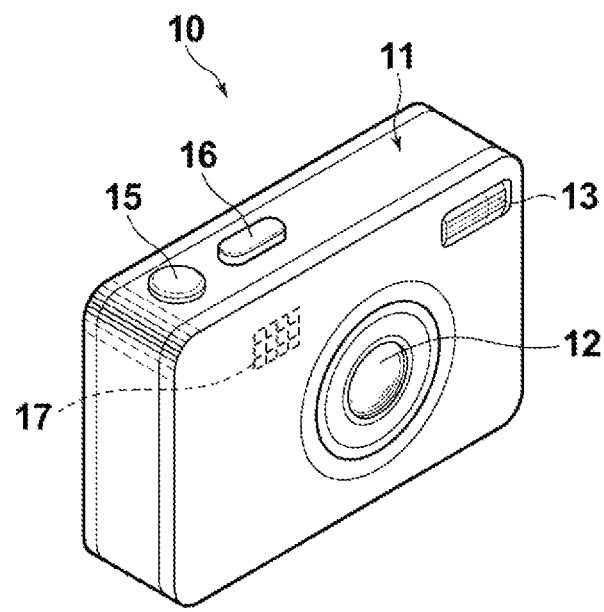
FIG. 21 is a schematic diagram illustrating the configuration of an imaging apparatus according to an embodiment of the present invention.

Next, an imaging apparatus according to the present invention will be described. FIG. 21 is a perspective view illustrating the shape of a camera according to an embodiment of the present invention. A camera 10, which is illustrated here, is a compact digital camera. A small-size imaging lens 12 according to an embodiment of the present invention is provided on the front surface and in the inside of a camera body 11. A flash output device 13 for outputting flash to a subject is provided on the front surface of the camera body 11. A shutter button 15 and a power source button 16 are provided on the upper surface of the camera body 11, and an imaging device 17 is provided in the inside of the camera body 11. The imaging device 17 images an optical image formed by the small-size imaging lens 12, and converts the optical image into electrical signals. For example, the imaging device 17 is composed of a CCD, a CMOS or the like.

As described above, the size of the imaging lens 12 according to the embodiment of the present invention is sufficiently reduced. Therefore, even if a collapsible mount type camera is not adopted as the camera 10, it is possible to make the camera 10 compact both when the camera 10 is being carried and when photography is performed. Further, when a collapsible mount type camera is adopted, it is possible to reduce the size of the camera even more and to improve the portability, compared with conventional collapsible mount type cameras. Further, the camera 10 to which the imaging lens 12 according to the present invention has been applied can perform photography with high image qualities.

Figure 22A:
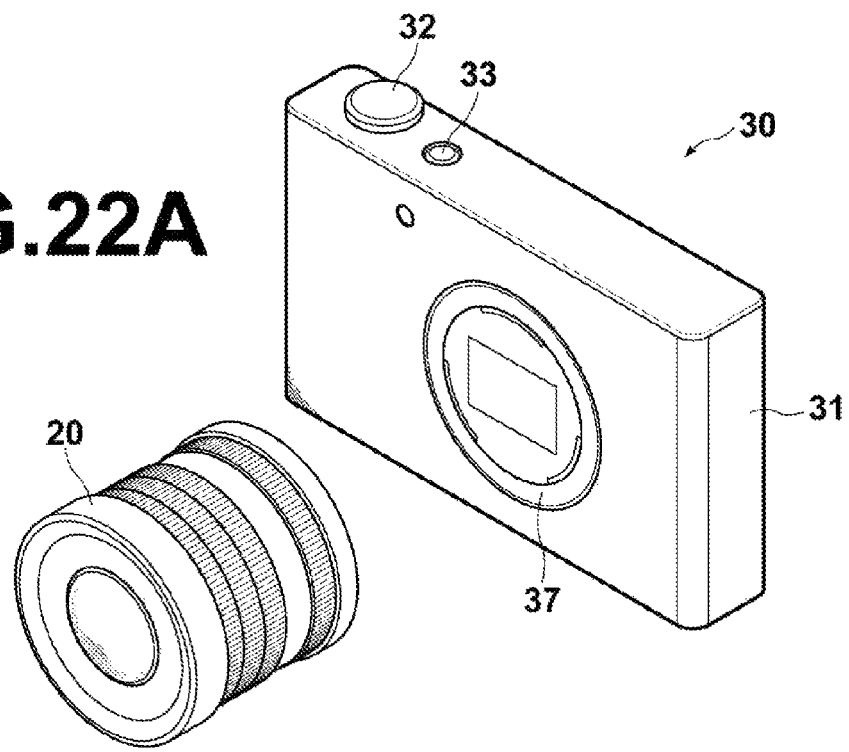
FIG. 22A is a schematic diagram illustrating the configuration of an imaging apparatus according to another embodiment of the present invention.
Figure 22B:
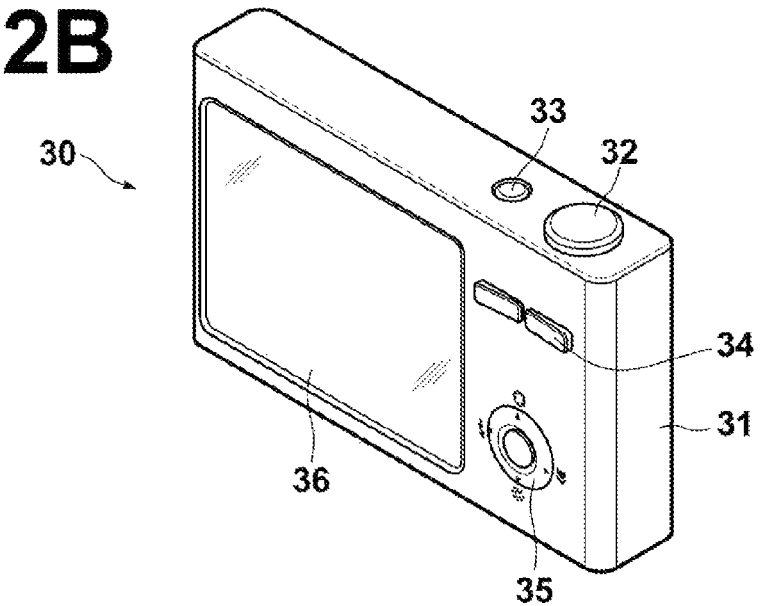
FIG. 22B is a schematic diagram illustrating the configuration of the imaging apparatus according to the other embodiment of the present invention.

Next, an imaging apparatus according to another embodiment of the present invention will be described with reference to FIGS. 22A and 22B. A camera 30, the shape of which is illustrated here in a perspective view, is a so-called mirrorless single-lens type digital still camera, on which an interchangeable lens 20 is detachably mountable. FIG. 22A is an external view of the camera 30 viewed from the front side, and FIG. 22B is an external view of the camera 30 viewed from the back side.

This camera 30 includes a camera body 31, and a shutter button 32 and a power source button 33 are provided on the upper surface of the camera body 31. Further, operation units 34 and 35 and a display unit 36 are provided on the back surface of the camera body 31. The display unit 36 is provided to display an image obtained by imaging and an image that is present within an angle of view before imaging.

An opening for photography, through which light from a target of photography enters, is provided at a central part of the front surface of the camera body 31. Further, a mount 37 is provided at a position corresponding to the opening for photography, and the interchangeable lens 20 is mountable on the camera body 31 by the mount 37. The interchangeable lens 20 is the imaging lens of the present invention housed in a lens barrel.

Further, an imaging device (not illustrated), such as a CCD, which receives an image of a subject formed by the interchangeable lens 20 and outputs imaging signals based on the image, a signal processing circuit for generating an image by processing the imaging signals output from the imaging device, a recording medium for recording the generated image and the like are provided in the camera body 31. This camera 30 performs photography of a still image for one frame each time when the shutter button 32 is pressed. Image data obtained by this photography are recorded in the recording medium.

When the imaging lens according to the present invention is adopted as the interchangeable lens 20 used in such a mirrorless single-lens camera 30, the size of the camera 30 with the lens mounted thereon is sufficiently small. Further, photography with high image qualities is possible.

So far, the present invention has been described by using embodiments and examples. However, the present invention is not limited to the embodiments nor to the examples, and various modifications are possible. For example, values of a curvature radius, a surface distance, a refractive index, an Abbe number, aspherical surface coefficients and the like of each lens element are not limited to the values in the numerical value examples, but may be other values.

What is claimed is:

1. An imaging lens substantially consisting of:
a first lens group;
a stop; and
a second lens group in this order from an object side,
wherein the first lens group substantially consists of three or less lenses including at least one negative lens and a positive lens, and
wherein the second lens group substantially consists of a 21st lens group and a 22nd lens group in this order from the object side, and
wherein the 21st lens group substantially consists of three or less lenses and has positive refractive power, and
wherein the 22nd lens group substantially consists of two lenses of a negative lens and a positive lens in this order from the object side, and
wherein the following conditional formulas (1), (2), (3) and (5) are satisfied:

$$2.1 < TL/Y < 2.9 \quad (1);$$

$$0.50 < \Sigma d/TL < 0.85 \quad (2);$$

$$0.35 < Y/f < 0.85 \quad (3); \text{ and}$$

$$0.6 < f/f1 < 1.4 \quad (5), \text{ where}$$

TL: a distance on an optical axis from a most-object-side lens surface in an entire system to an image plane when a back focus portion is a distance in air,
Y: a maximum image height,
$\Sigma d$: a distance on the optical axis from a most-object-side lens surface in the first lens group to a most-image-side lens surface in the second lens group,
f: a focal length of the entire system, and
f1: a focal length of the first lens group.

2. The imaging lens, as defined in claim 1, wherein at least one of the following conditional formulas (1-1), (2-1) and (3-1) is satisfied:

$$2.2 < TL/Y < 2.8 \quad (1\text{-}1);$$

$$0.55 < \Sigma d/TL < 0.80 \quad (2\text{-}1); \text{ and}$$

$$0.40 < Y/f < 0.82 \quad (3\text{-}1).$$

3. The imaging lens, as defined in claim 1, wherein the following conditional formula (4) is satisfied:

$$0.70 < ST/TL < 0.95 \quad (4), \text{ where}$$

ST: a distance on the optical axis from the stop to the image plane, and
TL: the distance on the optical axis from the most-object-side lens surface in the entire system to the image plane when a back focus portion is a distance in air.

4. The imaging lens, as defined in claim 3, wherein the following conditional formula (4-1) is satisfied:

$$0.75 < ST/TL < 0.92 \quad (4\text{-}1).$$

5. The imaging lens, as defined in claim 1, wherein the following conditional formula (5-1) is satisfied:

$$0.7 < f/f1 < 1.3 \quad (5\text{-}1).$$

6. The imaging lens, as defined in claim 1, wherein the first lens group substantially consists of two lenses of a negative lens having a meniscus shape with its convex surface facing the object side and a positive lens in this order from the object side.

7. The imaging lens, as defined in claim 6, wherein said two lenses of the first lens group are cemented together.

8. The imaging lens, as defined in claim 1, wherein the 22nd lens group has negative refractive power.

9. The imaging lens, as defined in claim 1, wherein the following conditional formulas (6) and (7) are satisfied:

$$Nd22p > 1.70 \quad (6); \text{ and}$$

$$28 < vd22p < 56 \quad (7), \text{ where}$$

Nd22p: a refractive index of the positive lens constituting the 22nd lens group for d-line, and
vd22p: an Abbe number of said positive lens of the 22nd lens group for d-line.

10. The imaging lens, as defined in claim 1, wherein the following conditional formulas (8) and (9) are satisfied:

$$Nd1p > 1.75 \quad (8); \text{ and}$$

$$35 < vd1p < 55 \quad (9), \text{ where}$$

Nd1p: a refractive index of said positive lens of the first lens group for d-line, and
vd1p: an Abbe number of said positive lens of the first lens group for d-line.

11. The imaging lens, as defined in claim 10, wherein the following conditional formula (9-1) is satisfied:

$$38 < vd1p < 52 \quad (9\text{-}1).$$

12. The imaging lens, as defined in claim 1, wherein the 21st lens group substantially consists of a positive lens and a negative lens.

13. The imaging lens, as defined in claim 1, wherein the 21st lens group substantially consists of a positive lens.

14. An imaging apparatus comprising:
the imaging lens, as defined in claim 1 including a device that converts the image into electrical signals.

* * * * *